US010519995B2

(12) United States Patent
Shinbutsu et al.

(10) Patent No.: US 10,519,995 B2
(45) Date of Patent: Dec. 31, 2019

(54) DUAL-THREADED SCREW STRUCTURE

(71) Applicant: FORM ROLL TECH CO., LTD., Ohtsuki-shi, Yamanashi (JP)

(72) Inventors: Toshinaka Shinbutsu, Ohtsuki (JP); Teruie Takemasu, Suwa (JP); Shuichi Amano, Ohtsuki (JP)

(73) Assignee: FORM ROLL TECH CO., LTD., Ohtsuki-shi (JP)

( * ) Notice: Subject to any disclaimer, the term of this patent is extended or adjusted under 35 U.S.C. 154(b) by 162 days.

(21) Appl. No.: 15/576,981

(22) PCT Filed: May 27, 2016

(86) PCT No.: PCT/JP2016/065793
§ 371 (c)(1),
(2) Date: Nov. 27, 2017

(87) PCT Pub. No.: WO2016/194842
PCT Pub. Date: Dec. 8, 2016

(65) Prior Publication Data

US 2018/0163757 A1 Jun. 14, 2018

(30) Foreign Application Priority Data

May 29, 2015 (JP) ................................ 2015-110292
Nov. 9, 2015 (JP) ................................ 2015-219841

(51) Int. Cl.
*F16B 5/02* (2006.01)
*B21H 3/06* (2006.01)
(Continued)

(52) U.S. Cl.
CPC ............ *F16B 5/0275* (2013.01); *B21H 3/06* (2013.01); *F16B 25/0057* (2013.01); *F16B 33/02* (2013.01)

(58) Field of Classification Search
CPC .... F16B 5/0275; F16B 25/00; F16B 25/0047; F16B 25/0052; F16B 25/0057;
(Continued)

(56) References Cited

U.S. PATENT DOCUMENTS 3,069,961 A * 12/1962 Baubles ................. F16B 33/02 285/334
3,180,202 A * 4/1965 Kahn .................... B21H 3/027 411/386
(Continued)

FOREIGN PATENT DOCUMENTS

EP 167 781 A1 1/2002
JP 7-103221 A 4/1995
(Continued)

OTHER PUBLICATIONS

International Search Report dated Jul. 5, 2016, issued in counterpart International Application No. PCT/JP2016/065793 (1 page).

*Primary Examiner* — Robert S Delisle
(74) *Attorney, Agent, or Firm* — Westerman, Hattori, Daniels & Adrian, LLP

(57) ABSTRACT

The dual-threaded screw structure 1 has a first thread (S1) and a second thread (S2) with various leads formed on the dual-thread portion and has a function of preventing loosening without insufficiency in strength of the dual-thread portion. This dual-thread portion is composed of a first thread (S1) consisting of a coarse thread with a standard pitch P and a specific second thread (S2). The second thread (S2) is formed continuously on the thread ridge of the first thread (S1). The second thread (S2) has a sectional shape of this thread groove same as or substantially same as the first thread (S1), has a same twisting direction as the first thread (S1) and is a multi-threaded thread having threads with a
(Continued)

triangular sectional shape and having a lead (L=n*P) a determined number (n)-times of a standard pitch P.

17 Claims, 23 Drawing Sheets

(51) Int. Cl.
*F16B 33/02* (2006.01)
*F16B 25/00* (2006.01)

(58) Field of Classification Search
CPC .............. F16B 25/0068; F16B 25/0073; F16B 33/002; F16B 33/02; F16B 39/00; F16B 39/30; F16B 5/02; Y10S 411/929; Y10S 411/938
USPC ........ 411/259, 307, 310–311, 411–412, 413, 411/415
See application file for complete search history.

(56) References Cited

U.S. PATENT DOCUMENTS

| | | | | | |
|---|---|---|---|---|---|
| 3,207,023 | A * | 9/1965 | Knohl | F16B 25/0031 | 411/387.3 |
| RE27,678 | E * | 6/1973 | Orlomoski | F16B 39/30 | 411/311 |
| 5,188,496 | A * | 2/1993 | Giannuzzi | F16B 25/00 | 411/310 |
| 5,294,227 | A * | 3/1994 | Forster | F16B 25/0026 | 411/386 |
| 5,885,041 | A * | 3/1999 | Giannuzzi | F16B 13/141 | 411/258 |
| 6,976,818 | B2 * | 12/2005 | Levey | F16B 33/02 | 411/310 |
| 7,156,600 | B2 * | 1/2007 | Panasik | B21H 3/02 | 411/308 |
| 7,753,631 | B2 * | 7/2010 | Sugimura | F16B 33/02 | 411/308 |
| 2003/0156921 | A1 * | 8/2003 | Nagawa | F16B 33/02 | 411/411 |
| 2015/0003934 | A1 * | 1/2015 | Pomerantz | F16B 33/02 | 411/413 |

FOREIGN PATENT DOCUMENTS

| | | | |
|---|---|---|---|
| JP | 2003-184848 | A | 7/2003 |
| JP | 2003-220438 | A | 8/2003 |
| JP | 3546211 | B1 | 7/2004 |
| JP | 2010-14226 | A | 1/2010 |

* cited by examiner 2-threaded thread having 3-times lead angular position of 0° angular position of 90° varied example of 2-threaded thread having 3-times lead
FIG.3 (a)
angular position of 0°
FIG.3 (b)
angular position of 90°
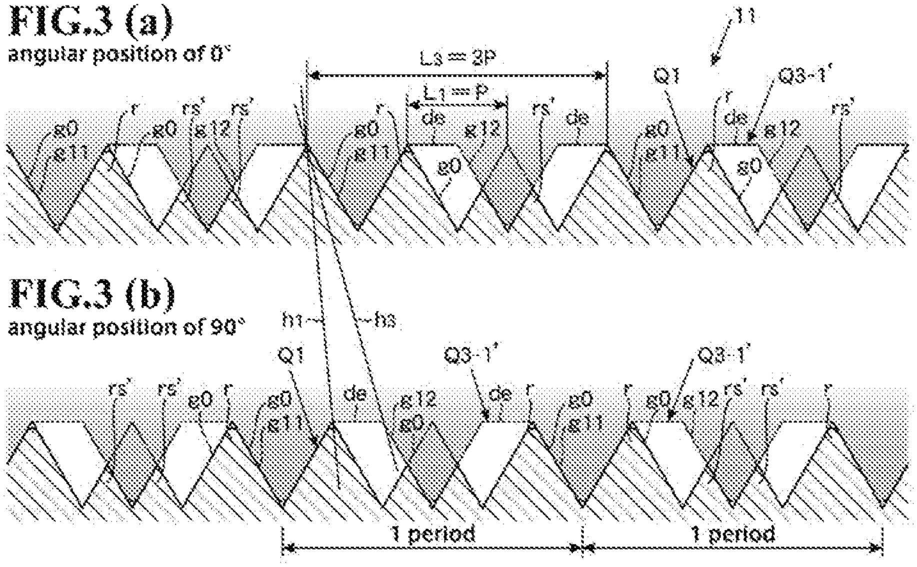
1-threaded thread having 3-times lead
FIG.4 (a)
angular position of 0°
FIG.4 (b)
angular position of 90°
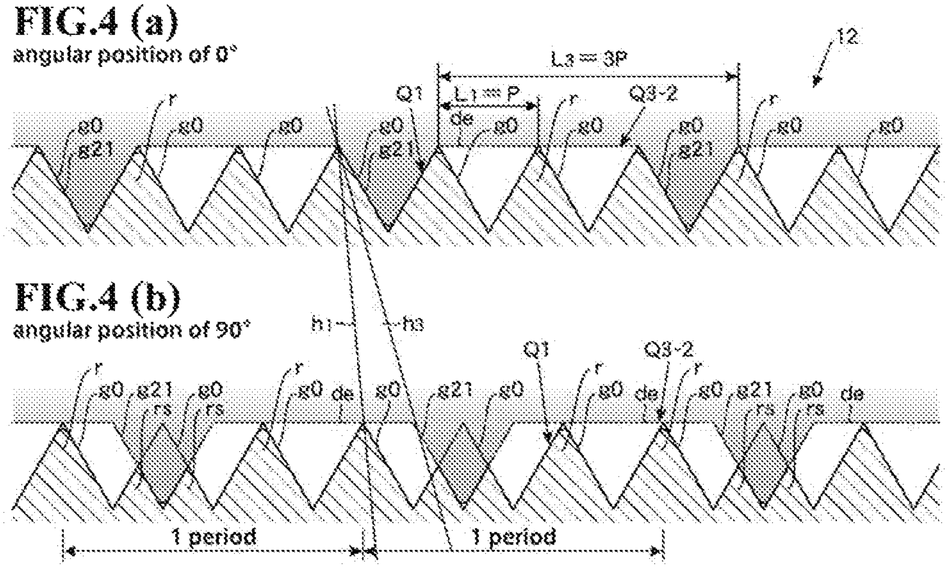

Comparison of area ratio of 2-threaded thread having 3-times lead in each angular position Charging rate of varied example of 2-threaded thread having 3-times lead 2-threaded thread having 4-times lead angular position of 0° angular position of 90°

Comparison of area ratio of 2-threaded thread having 4-times lead in each angular position Charging rate of 2-threaded thread having 4-times lead 1-threaded thread having 2-times lead angular position of 0° angular position of 90°

Comparison of area ratio of 2-threaded thread having 2-times lead in each angular position Test of nut threading torque FIG.21 (b) section in A-A

| | 2-threaded thread having 3-times lead | varied example of 2-threaded thread having 3-times lead | 1-threaded thread having 3-times lead |
|---|---|---|---|
| 0° |  |  |  |
| 30° |  |  |  |
| 60° |  |  |  |
| 90° |  |  |  |
| 120° |  |  |  |
| 150° |  |  |  |
| 180° |  |  |  |

DUAL-THREADED SCREW STRUCTURE

TECHNICAL FIELD

The present invention relates to a dual-threaded screw structure having a function preventing loosening. More particularly, this dual-threaded screw structure (of an external thread) is one that has two kinds of threads, one being a first thread (S1) that has a triangular sectional shape of thread and the other being a second thread (S2) formed on the thread of the first thread (S1). This dual-threaded screw structure is one, in which the second thread (S2) is a multi-threaded screw having a lead different from one of the first screw (S1) and has a triangular sectional shape similar to one of the first screw (S1). This dual-threaded screw structure, without its strength being insufficient, can be used for a fastening tool having a function preventing loosening and a lead cam unit.

BACKGROUND OF THE INVENTION

Various forms of fastening structure with screws having a function preventing loosening are known conventionally. A common one is by a fastening method called a "double nut". This fastening method is one in which a nut 1 of an internal thread is fastened on to a threaded portion of a dual-threaded screw structure (of an external thread) and then a nut 2 of an internal thread is fastened to come in contact with the nut 1 so that tensional force (axial force) acts between both nuts. By mutual fastening with the nut 1 and nut 2, loosening of the screw is prevented from occurring by the vibration, etc., of a structure where this double but is used. In this "double nut", the nut 1 is one for preventing loosening (a thinner nut) and the nut 2 fastening from backward is one for fastening (a thicker nut).

A technique improving this is proposed in which threads having different pitches (e.g., a coarse thread and a fine thread) are formed on a threaded portion (of an external thread) and fastening by a nut for a coarse thread and a nut for a fine thread is made, so that the difference of pitch in both threads provides a function preventing loosening. As a method for manufacturing bolts used in this, a method for manufacturing a multi-threaded screw bolt is known in which a coarse thread and a fine thread are formed thereon (see, e.g., Patent Document 1). Further, a technique regarding a bolt preventing loosening is also known in which either one of a coarse thread and a fine thread is a multi-threaded thread (see, e.g., Patent Documents 2 and 3).

Furthermore, a technique regarding a shape of a thread of a bolt manufactured by rolling is proposed in which the thread of the bolt is composed of a coarse thread having a first standard pitch and a fine thread having a second pitch smaller than the first pitch, in order to equalize load of rolling as plastic deformation in rolling (see Patent Document 4).

PRIOR ART DOCUMENTS

Patent Documents

Patent Document 1: JP Patent No. 3546211

Patent Document 2: JP Published Patent Application No. 2003-184848

Patent Document 3: JP Published Patent Application No. 2003-220438

Patent Document 4: JP Published Patent Application No. 2010-014226

DISCLOSURE OF THE INVENTION

Problems to be Solved by the Invention

As explained above, a conventional bolt as a dual-threaded screw structure having a function preventing loosening utilizes a difference of thread pitches in a nut of a coarse thread and a nut of a fine thread on a threaded portion of a bolt composed of a coarse thread and a fine thread. That is, when fastening by the two nuts is made by screwing both nuts respectively, difference in fastening torque occurs because of the difference in pitches of the threads. Such method for preventing loosening with the difference in fastening torque is dominantly implemented. Here, in each of most of such bolts, its threaded portion is composed such that a fine thread with a same triangular sectional shape is formed on a coarse thread with a triangular sectional shape.

The threaded portion of the bolt is composed such that a fine thread is formed on a coarse thread and protrusions (each of which has nearly triangular sectional shape respectively) of the thread of the fine thread having a shallow groove with a small pitch are formed periodically as seen in the section of the axial direction. Due to this, bolts as disclosed in the above mentioned Patent Documents 1 to 4, each of which is composed of a coarse thread and a fine thread, has insufficient strength for screw fastening (shear fracture of thread ridge, insufficiency in allowable contact face pressure, etc.), because the cross sectional shape (area) of the fine thread is small. That is, the small sectional area of the thread of the fine thread decreases the strength of the thread portion. For example, when an intense axial force is applied to the fine thread via a nut, there is such a probability that deformation or fracture of the fine thread may occur, because its shear length (the length of the bottom side of the thread) is short. Further, in a rolling die for manufacturing this thread, such awkwardness may occur that a part of a thread ridge of the rolling die for forming a fine thread is damaged, because the triangular cross sectional area is small. The rolling die, in which a part of the thread ridge is damaged, becomes a defective article. This necessitates a labor of replacing the defective with a new rolling die, thus decreasing manufacturing efficiency by operation of bolt rolling.

On the other hand, for a dual-threaded screw structure (of an external thread) comprising a coarse thread with a standard pitch and a multi-threaded coarse thread with a lead n-times of the standard pitch formed on the thread of the former coarse thread, such one is conceivable that has a performance of preventing loosening due to the difference between the two leads. However, in such a dual-threaded screw structure, height of the thread of such varies periodically, so that portions with successive low thread ridges are formed for some angular positions and volume (or area of sectional face) of less than one in an ordinary screw. Due to this, when a nut is screwed onto the threaded portion of such a dual-threaded screw structure, threads of both screws are engaged (contact) with each other in a small area, so that there is a case where strength of thread (for shear fracture of thread, contact face pressure, etc.) is insufficient. On the other hand, for a bolt preventing loosening provided with a dual-threaded screw structure, high strength is required for the threaded portion in infrastructure, e.g., for bridges, and it is desired to develop a dual-threaded screw structure providing improvement in fastening strength of screws without using fine threads, etc.

The present invention has been created for solving such problems in the prior arts and attains the following objects.

It is an object of the present invention to provide a dual-threaded screw structure comprising a first thread of a common specification and a specialized second thread, formed on the first thread, that has a lead different from that of the first thread and has a form of a transformed multi-thread, enabling the dual-threaded screw structure to be used as a fastening tool preventing loosening without insufficiency in strength of the threaded portion.

It is another object of the present invention to provide a dual-threaded screw structure comprising a first thread of a common specification and a specialized second thread, formed on the first thread, that has a lead different from that of the first thread and has a form of a transformed multi-thread, enabling the dual-threaded screw structure to be used as a lead cam mechanism for converting rotational movement into translation movement.

Means for Solving the Problems

The present invention provides the following means for solving the aforementioned problems.

A dual-threaded screw structure according to a first aspect of the invention has two kinds of threads formed on the shank, said dual-threaded screw structure comprising:

a first thread (S1) formed on the shank (3) with a pitch (P) to have a triangular sectional shape of the thread ridge, and a second thread (S2) formed on said thread ridge successively in the same twisting direction as said thread ridge to have a triangular sectional shape of the thread ridge, the second thread (S2) being a thread in which the number of threads is less by one thread or more than a multi-threaded thread having a lead (Ln) a determined number (n)-times of the pitch (P) of said thread ridge.

The dual-threaded screw structure according to a second aspect of the invention is characterized in that, in the first aspect, said determined number (n) is an integer number-times of the pitch (P).

The dual-threaded screw structure according to a third aspect of the invention is characterized in that, in any of the first and second aspects, the lead (Ln) of said second thread (S2) is two-times of the pitch (P) of said thread ridge, and the number of threads of said multi-threaded thread is two threads and one-thread of said thread is formed.

The dual-threaded screw structure according to a fourth aspect of the invention is characterized in that, in any of the first and second aspects, the lead (Ln) of said second thread (S2) is three-times of the pitch (P) of said thread ridge, and the number of threads of said multi-threaded thread is three threads and one- or two-thread(s) of said thread is formed.

The dual-threaded screw structure according to a fifth aspect of the invention is characterized in that, in any of the first and second aspects, the lead (Ln) of said second thread (S2) is four-times of the pitch (P) of said thread ridge, and the number of threads of said multi-threaded thread is four threads and two-threads of said thread is formed.

The dual-threaded screw structure according to a sixth aspect of the invention is characterized in that, in any of the first and second aspects, in said first thread (S1) and second thread (S2), the groove between the low hill-like thread ridges appearing in particular angular positions in the section extending through the center line of said dual-threaded screw structure is charged with a base metal.

The dual-threaded screw structure according to a seventh aspect of the invention is characterized in that, in the sixth aspect, the outer diameter of said groove is an effective diameter of said first thread (S1).

The dual-threaded screw structure according to an eighth aspect of the invention is characterized in that, in any of the first and second aspects, said first thread (S1) and second thread (S2) are rolled threads in which macro fiber structure of base material flows continuously along the thread ridges.

The dual-threaded screw structure according to a ninth aspect of the invention is characterized in that, in any of the first and second aspects, said first thread (S1) is a metric coarse thread.

The dual-threaded screw structure according to a tenth aspect of the invention is characterized in that, in any of the first and second aspects, said dual-threaded screw structure has a shank (3) of a bolt (81), a first nut (81) screwed onto said first thread (S1) and a second nut (84) having a triangular sectional shape of the thread ridge and screwed onto said second thread (S2), said dual-threaded screw structure being a part of a fastening tool (80) for fastening a member with another member to be fixed.

The dual-threaded screw structure according to a fourth aspect of the invention is characterized in that, in any of the first and second aspects, said dual-threaded screw structure is a part of a lead cam device (90) having said shank (3) as a lead cam (91), a first cam follower (94) engaged with said first thread (S1) and a second cam follower (92) engaged with said second thread (S2).

Advantageous Effect of the Invention

With this dual-threaded screw structure according to the present invention, comprising a first thread (S1) and a second thread (S2), a standard thread ridge or a thread ridge of a form similar to the standard thread ridge can be formed successively or for each predetermined interval in each angular position around the axis of the shank, thus enabling improvement in strength of the thread portion. Further, with the dual-threaded screw structure, volume of the thread ridge increases, durability to contact face pressure on a nut is improved and durability to shear fracture stress of the thread ridge is also improved, compared with prior art bolts preventing loosening composed of coarse thread, fine thread, etc. Furthermore, the dual-threaded screw structure according to the present invention does not use prior art fine thread, the groove along the thread is not plugged, e.g., with molten zinc through immersion treatment for plating. As a result, such dual-threaded screw structure can be used as a fastening tool for infrastructure, e.g., for bridges that uses large diameter bolts in which the thread is subjected to thick plating treatment.

BRIEF EXPLANATION OF THE DRAWINGS

FIG. 3 is sectional views, across planes extending through the axis of the screw, of the dual-threaded portion of the dual-threaded screw structure 11 according to a varied example of the embodiment 1 of the present invention for explaining composition of the dual-threaded screw, in which FIG. 3(*a*) shows partially a sectional configuration of the dual-threaded portion in "an angular position of 0°" and FIG. 3(*b*) shows partially a sectional configuration of the dual-threaded portion in "an angular position of 90°".

FIG. 4 is sectional views, across planes extending through the axis of the screw, of the dual-threaded portion of the dual-threaded screw structure 12 according to another varied example of the first embodiment of the present invention for explaining composition of the dual-threaded screw, in which FIG. 4(*a*) shows partially a sectional configuration of the dual-threaded portion in "an angular position of 0°" and FIG. 4(*b*) shows partially a sectional configuration of the dual-threaded portion in "an angular position of 90°".

EXPLANATION OF PREFERRED EMBODIMENT

Figure 1:
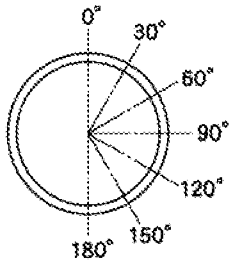
FIG. 1 is a view showing a dual-threaded screw structure according to the present invention, in which FIG. 11(*a*) is a side view and FIG. 1(*b*) is a front view.
Figure 1:
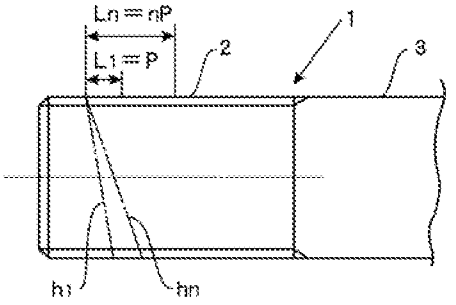

Each embodiment of the dual-threaded screw structure according to the present invention will be explained below referring to drawings. FIG. 1 is a view showing an embodiment of dual-threaded screw structure, in which FIG. 1(*a*) is a side view and FIG. 1(*b*) is a front view.

[Dual-Threaded Screw Structure 1]

The dual-threaded screw structure according to the present invention will be summarized below in the first place. The dual-threaded screw structure 1 has thread ridges with triangular sectional shapes around the periphery of the shank 3. In this embodiment, a first thread (S1) of a metric coarse thread (referred to as "a coarse thread" below) with a standard normalized pitch P (=a lead $L_1$) corresponding to nominal diameter is formed. A second thread (S2) with a lead $L_n$ (n*P) of determined n-times of the pitch (P) of this coarse thread is formed on the thread ridge of the first thread. This second thread (S2) is a thread (a thread ridge and a groove) with a triangular sectional shape formed continuously and spirally on the thread ridge of the first thread (S1). Further, the second thread (S2) is a one-threaded thread or multi-threaded thread with a lead (nP) n-times of the pitch (P) of the thread, the direction of the spiral line of the second thread (S2) being the same twisting direction as the first thread (S1). Here, precisely, the second thread (S2) is one in which thread number is less than the thread number of a primary multi-threaded thread by one thread or more (also called as a "new multi-threaded thread"). In this, while the thread is one in which thread number is less than the thread number of a primary multi-threaded thread by one thread or more, there is a case where the thread is not a multi-threaded, but a one-threaded thread as a result, depending on the number of the extracted threads.

Further, the lead $L_1$ of the first thread (S1) is smaller than the lead $L_n$ of the second thread (S2). The configuration and pitch P of the first thread (S1) are ones defined in the standard concerning screws (e.g., the International Organization for Standardization: ISO). This embodiment employs basic matters such as metric coarse thread, etc. Here, the pitch P of the first thread (S1) may be one different from the standard. Moreover, while the dual-threaded screw structure 1 is shown only for the dual-threaded portion and the vicinity thereof in FIG. 1, this dual-threaded screw structure is formed as a shank, a bolt (e.g., a hexagon head bolt, a hexagon socket head bolt, an eye bolt, a stud bolt, an anchor bolt, a set screw, a wing bolt, a U-bolt or a ceiling anchor bolt), etc.

Figure 24:
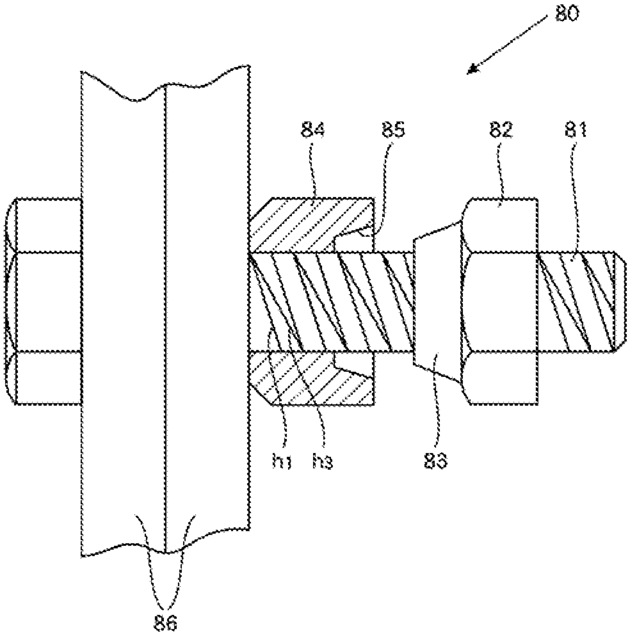
FIG. 24 is views showing an example of the aforementioned dual-threaded screw structure used as a fastening tool with a nut preventing loosening, in which FIG. 24(*a*) is a partial sectional view and FIG. 24(*b*) is a sectional view showing engagement of the nut with the dual-threaded screw structure.
Figure 24:
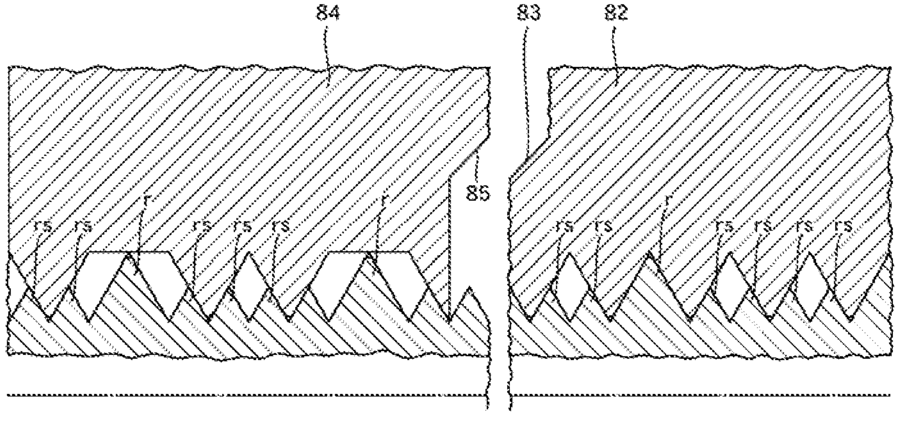

When this dual-thread screw structure 1 is used as with double nuts for preventing loosening, a first nut 82 as an internal thread screw (a nut for fastening) is screwed onto the first thread (S1) (a metric coarse thread) and a second nut 84 (a nut for preventing loosening) is screwed onto the second thread (S2) (see FIGS. 24(*a*) and (*b*)). With such composition, a strong fastening force is generated with the first nut 82 screwed onto the first thread (S1), and along with this, fastening is performed with the second nut 84 as a nut for preventing loosening. With the lead angle of these two nuts different from each other, performance of preventing loosening can be attained. That is, this dual-threaded screw structure 1 can provide a high pre-tension force on the shank 3 by fastening the structure to be fastened with the first nut 82 for the first thread screwed onto the first thread (S1) of the dual-threaded portion 2. As a result, fastened state can be maintained even if external action is applied in the axial direction.

Further, the second thread (S2) of this embodiment is composed of a thread with a same triangular sectional shape as a coarse thread (a thread ridge and a groove) and does not employ a fine thread. Consequently, with this dual-threaded screw structure 1, the contact area of the thread ridge and the nut can be larger compared with a prior art bolt, etc. having a fine thread and the volume of the thread increases. Due to this, the area for engagement with the nut for the second thread can be larger, thus enabling the allowable stress to shear fracture and allowable face pressure to be higher, so that such a case does not occur that strength of the threaded portion is insufficient. Here, while the second thread (S2) of this embodiment is preferable to have a lead larger than determined times of the lead of the first thread (S1), a thread with a lead less than of four times of the lead of the first thread is better, considering that metal material practical and common for use with double-nut is used. The reason for this is that a nut screwed onto the second thread (S2) needs at least more than one cycle when the lead is large, thereby causing the axial length of the nut to be long, and machining becomes difficult when the nut is fabricated with a tap. For this, a lead less than of four times is preferable for the second thread (S2).

As described above, the first thread (S1) according to the embodiment of the present invention is a metric coarse thread. The second thread (S2) is one in which thread number is less than the thread number of a primary multi-threaded thread by one thread or more. The inventor, et. al., consecutively studied and developed a dual-threaded screw structure, in which, taking a coarse thread (a first thread (S1)) as the basis, the thread number is decreased by extracting the thread number from the second thread (S2) (multi-threaded thread) ones formed thereon by one thread or more. As a result, the dual-threaded screw structure according to the present invention is devised that provides both improvement in the strength of the dual-threaded portion 2 and performance of preventing loosening. The dual-threaded screw structure 1 according to the present invention will be explained below, for each preferred combination of the first thread (S1) and the second thread (S2) for the dual-thread portion 2.

Embodiment 1

[A Dual-Threaded Screw Structure Consisting of a Coarse Thread and a "Two-Threaded Thread Having a Three-Times Lead" ]

A specific explanation will be made referring to FIG. 2. In the dual-threaded screw structure according to the embodiment 1 shown in FIG. 2, a first thread (S1) consisting of a thread and a groove is formed on the dual-threaded portion 2 of the shank 3. This thread is a standard "metric coarse thread" (referred to as a "coarse thread" below) defined in ISO (the International Organization for Standardization) and a first thread (S1) having a thread with a triangular sectional shape is formed. A nut having a common internal metric thread formed thereon is screwed onto the first thread (S1). Further, a second thread (S2) is formed on the thread ridge of the first thread as if parts of it were cut out (removed). This second thread (S2) is a special one in which one thread is extracted from three-threaded thread and the extracted number of thread (thread ridge and groove) is not formed. That is, in this embodiment, one thread is extracted from the primary three-threaded thread (referred to as a "two-threaded thread having three-times lead" below).

Figure 2:
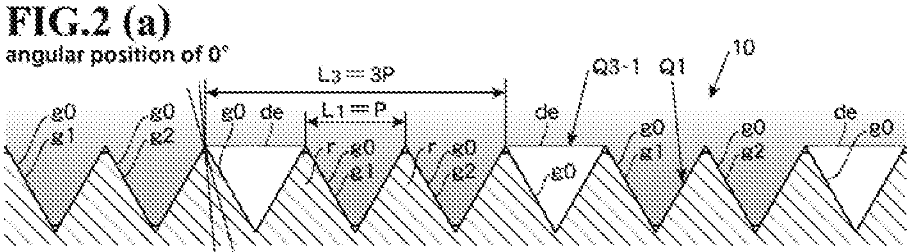
FIG. 2 is explanatory sectional views, taken in planes extending through the axis of the shank, of the dual-threaded portion of the dual-threaded screw structure 10 according to the embodiment 1 of the present invention for explaining composition of the dual-threaded screw, in which FIG. 2(*a*) shows partially a sectional configuration of the dual-threaded portion in "an angular position of 0°" and FIG. 2(*b*) shows partially a sectional configuration of the dual-threaded portion in "an angular position of 90°".
Figure 2:
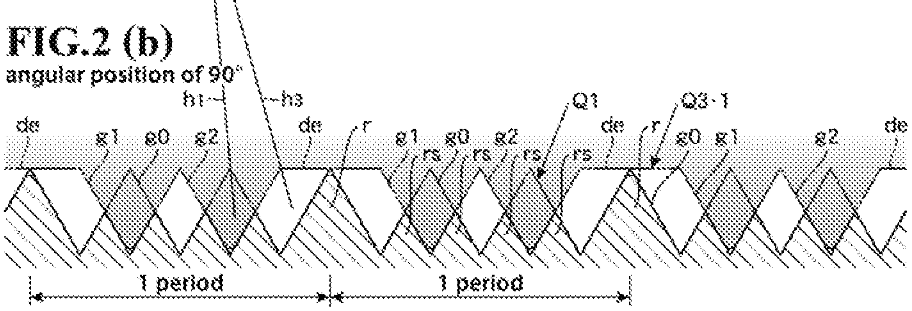

FIG. 2 is sectional views, taken in planes extending through the axis of the shank 3, of the dual-threaded portion of the dual-threaded screw structure 10 for explaining composition of the dual-threaded screw 10 (a "screw with a three-threaded thread having three-times lead") according to the embodiment 1, in which FIG. 2(*a*) shows a sectional configuration of the dual-threaded portion 2 of the dual-threaded screw structure 10 in "an angular position of 0°" and FIG. 2(*b*) shows a sectional configuration of the dual-threaded portion 2 of the dual-threaded screw structure 10 in "an angular position of 90°". In the dual-threaded screw structure 10 shown in FIGS. 2(*a*) and (*b*), a first thread (S1) of a metric coarse thread and a second thread (S2) of a similar metric coarse thread as a basic thread. The second thread (S2) is a two-threaded thread in which one thread is extracted from the primary three-threaded thread (referred to as a "two-threaded thread having three-times lead"). The first thread (S1) is a metric coarse thread having a standardized pitch P (lead $L_1$=P) in this embodiment 1 and the second thread (S2) is a two-threaded thread having a lead $L_3$ (=3P) three-times (integer number-times) of the pitch P of this metric coarse thread. In the second thread (S2) of a two-threaded thread, a two-threaded thread, in which one thread is extracted from the primary three-threaded thread (referred to as "a known three-threaded thread" below), is formed on the thread ridge of the first thread (S1).

The metric coarse thread as the first thread (S1) is a one-threaded thread in which the pitch P is same as the lead $L_1$, and a groove $g_0$ and thread ridge r (the hatched portion) are formed along a spiral line $h_1$ at a constant pitch. The "two-threaded thread having three-times lead" as the second thread (S2) is a thread having a lead $L_3$ (=3P), in which two-threaded grooves $g_1$, $g_2$ are formed along the spiral line $h_3$. The greyed portion in FIG. 2 shows a nut screwed onto the thread portion. In this, for convenience of explanation of the embodiment 1, explanation is made defining the angular position where the sectional shape of the groove $g_0$ of the coarse thread and the sectional shape of the grooves $g_1$, $g_2$ of the "two-threaded thread having a three-times lead" lap each other to be the "angular position of 0 degree" in FIG. 2(*a*).

In FIGS. 2(*a*) and (*b*), the first thread (S1: coarse thread) is a thread in which the sectional shape of the first thread ridge r shown with a contour line (a solid line) Q1 having a pitch P (=a lead $L_1$) is triangular. The second thread (S2) of the "two-threaded thread having a three-times lead" is one in which one thread is extracted from a known three-threaded thread. In other words, this is shown with a contour line Q3-1 (a two-dot chain line) in which thread (groove) by one is not formed and referred to a "a new two-threaded thread" according to the present invention. This new two-threaded thread has a portion in which two-threaded grooves $g_1$, $g_2$ are formed continuously with a determined pitch and a portion de in which a one-threaded groove is not formed neighboring to the groove $g_2$ (or the groove $g_1$). That is, the new two-threaded thread is a two-threaded thread transformed from a three-threaded thread having a lead $L_3$ in which portions de (outer peripheral face of the shank and flat portions as seen in section) and a set of grooves $g_1$, $g_2$ are formed alternately. As explained above, the greyed portion shown in FIGS. 2(*a*) and (*b*) shows a sectional shape of the thread ridge of the second nut screwed onto the second thread (S2) of the "two-threaded thread having a three-times lead.

In this "angular position of 90°" in FIG. 2(*a*), there is a first thread ridge r (the hatched portion) formed to be a basic thread ridge (of a triangular shape) as a primary coarse thread. This first thread ridge r exhibits a basic ridge (triangular in section) formed regularly and continuously with a constant interval of a pitch P. However, in the "angular position of 90°" in FIG. 2(*b*), the second low hill-like thread ridge $r_s$ with a less height appears as if the peak of the basic ridge as a primary coarse thread were partially cut out. In this angular position, the second thread ridge $r_s$ is formed with a thread configuration having a contour line in which four ridges succeed as a mountain range. That is, the first thread ridge r of the basic thread ridge (triangular) as a coarse thread is cut out and the second thread ridge $r_s$ is lowered, so that the shear fracture stress of the thread ridge becomes lower than that of the basic thread ridge (with a primary triangular shape). However, in the dual-threaded screw structure 10 according to the embodiment 1, the "new dual-threaded thread" as the second thread (S2) has a portion/portions where a thread (groove) is not formed in any angular position (an angular position of 0°, 180°, etc.), so that there is no case where a primary triangular thread ridge of a coarse thread does not remain, as explained below.

The dual-treaded screw structure 11 shown in FIGS. 3(*a*) and (*b*) is a varied example of the dual-threaded screw structure 10 shown in FIG. 2, and shown in a sectional view of the dual-threaded screw structure 11 (a varied example of "two-threaded thread having a three-times lead"). That is, the dual-threaded screw structure 11 corresponds to one in which the angular phase of the two-threaded thread of the dual-threaded screw structure 10 is changed. FIGS. 3(*a*) and (*b*) is sectional views taken in the plane extending through the axis of the shank, partially showing a sectional configuration of the dual-threaded portion 2 in each angular position, in which FIG. 3(*a*) shows one in "an angular position of 0°" and FIG. 3(*b*) shows one in "an angular position of 90°". That is, as the "two-threaded thread having a three-times lead" is one in which one thread is simply extracted from a primary three-threaded thread, the angular phase of the thread ridge is irregular. Thus, in the varied example, the angular position of the two-threaded thread is changed so that the two-threaded thread is disposed in an even manner.

The "two-threaded thread having a three-times lead" of this varied example (the greyed portion in FIG. 3 shows a nut screwed onto the thread portion in section) is a thread having a lead $L_3$ (=3P). This thread is a two-threaded thread different from the "two-threaded thread having a three-times lead" shown in FIGS. 2(*a*) and (*b*) in that two grooves $g_{11}$, $g_{12}$ are formed with an equal interval between them within the lead $L_3$. That is, in this varied example of "two-threaded thread having a three-times lead", portions de as shown with a contour line Q3-1' where a groove is not formed on the thread ridge of the coarse thread between the grooves $g_{11}$ and $g_{12}$ and between the grooves $g_{12}$ and $g_{11}$ (flat portions of the outer periphery seen in section).

A coarse thread is a one-threaded thread having a lead $L_1$ same as the pitch P and has a groove $g_0$ (a thread ridge $g_0$ as seen from a nut) along a spiral line $h_1$. The "two-threaded groove having a three-times lead (the varied example)" shown in FIG. 3 is of a two-threaded thread having a lead $L_3$, in which two-threaded grooves $g_{11}$, $g_{12}$ (greyed portion) are formed along the spiral line $h_3$ for each determined interval. In this dual-threaded screw structure 11, two low hill-like second thread ridge $r_s$' succeeding as a mountain range are formed between the first thread ridge r and the first thread ridge r of the basic thread ridge (hatched portion) in the sectional configuration of the "angular position of 0°" and the "angular position of 90°", and the second thread ridge $r_s$' is lower than the first thread ridge r. Because of being two thread ridges, shear fracture strength is higher than one shown in FIG. 2 in which four low hill-like thread ridges succeed as a mountain range.

[A Dual-Threaded Screw Structure Consisting of a Coarse Thread and a "One-Threaded Groove Having a Three-Times Lead" ]

FIGS. 4(*a*) and (*b*), showing a dual-threaded screw structure 12 according to the embodiment 1, is explanatory views showing partially the sectional configuration of the dual-threaded portion 2 in an "angular position of 0°" (FIG. 4(*a*)) and in an "angular position of 90°" (FIG. 4(*b*)) respectively. While the second thread (S2) shown in FIGS. 2 and 3 is a two-threaded thread in which one thread is extracted from a primary three-threaded thread, the dual-threaded screw structure 12 shown in FIGS. 4(*a*) and (*b*) is a two-threaded thread in which two threads are extracted from a primary three-threaded thread. Due to this, thread ridges of a coarse thread rather remain in any angle of section.

That is, in the dual-threaded screw structure 12, a coarse thread having a pitch P (the lead $L_1$=P) and a one-threaded thread having a lead $L_3$ (=3P) three times (integer number times) of the pitch P of the coarse thread are formed (referred to as a "one-threaded thread having a three times lead" below). In the sectional view of FIGS. 4(*a*) and (*b*), the coarse thread is a triangular thread having a pitch P shown with a contour line Q1. This "one-threaded thread having a three-times lead" is one in which two threads are not formed in (extracted from) the "known three-thread thread" and is extracted from a known three-threaded thread, that is, a one-threaded thread shown with a contour line Q3-2. This specific one-threaded thread is a one-threaded thread having a lead $L_3$ (=3P) in which portions having a one-threaded groove $g_{21}$ formed and portions de neighboring with the groove $g_{21}$ (greyed portion) without two-threaded groove formed (flat portions as seen in section as an outer peripheral face of the shank) are formed alternately. As the coarse thread is a one-threaded thread having a lead $L_1$ same as the pitch P, a thread groove $g_0$ and a thread ridge r are formed along the spiral line $h_1$.

The "one-threaded thread having a three-times lead" is a one-threaded thread having a lead $L_3$ (3P) and has a one-threaded groove $g_{21}$ (greyed portion) formed along the spiral line $h_3$. In the "angular position of 0°" shown in FIG. 4(*a*), a sectional configuration of a dual-threaded thread is formed in which a first thread ridge r (hatched portion) formed as a basic thread ridge succeed. In the sectional configuration in the "angular position of 90°" shown in FIG. 4(*b*), a first threaded ridge r as a basic thread ridge and two ridges of second thread ridge $r_s$ as two low hill-like thread ridges $r_s$ in a mountain range succeed (hatched portion), in which the second thread ridge $r_s$ is lower than the first thread ridge r.

Figure 5:
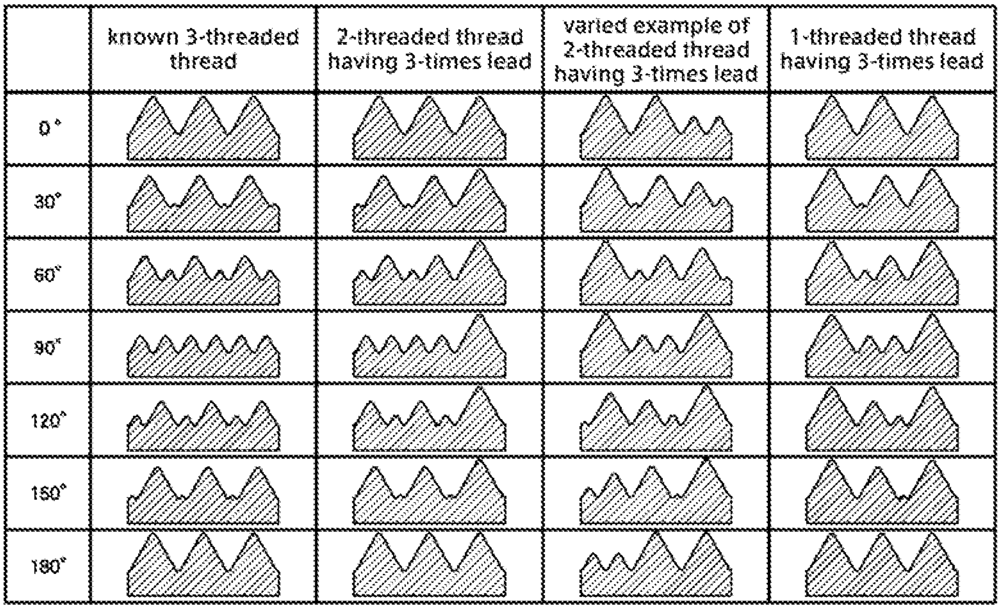
FIG. 5 is a list of the sectional views, each of which shows partially a sectional configuration of the dual-threaded portion across planes extending through the axis of the dual-threaded screw in each angular position, regarding the dual-threaded screw structures 10, 11, 12 according to the embodiment 1 of the present invention and a dual-threaded screw structure consisting of a coarse thread and a known three-threaded thread.
Figure 6:
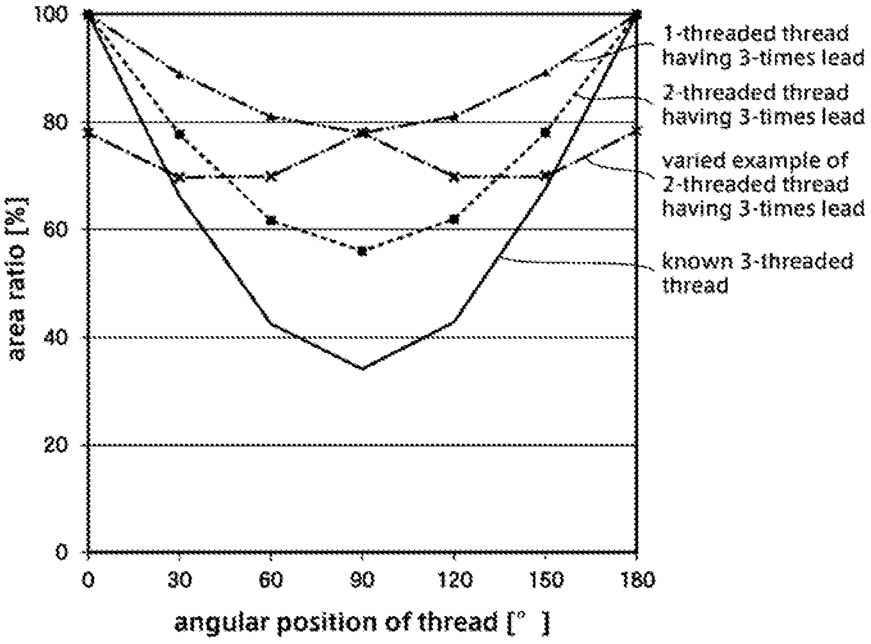
FIG. 6 is a graph showing the relation between each angular position and area ratio, regarding the dual-threaded screw structures shown in FIG. 5.

FIG. 5 is a list of sectional views, each of which, showing a sectional configuration of the thread ridge in the dual-threaded portion 2 of the shank 3 for each angular position, is a partial sectional view taken in a plane extending through the axis of the screw (center line), regarding either of the aforementioned dual-threaded screw structures 10, 11 and 12 in the case where a one-threaded or two-threaded thread is formed on a coarse thread. FIG. 6 is a graph showing the relation between each angular position and area ratio, regarding the dual-threaded portion 2 of each shank 3 shown in FIG. 5.

Figure 7:
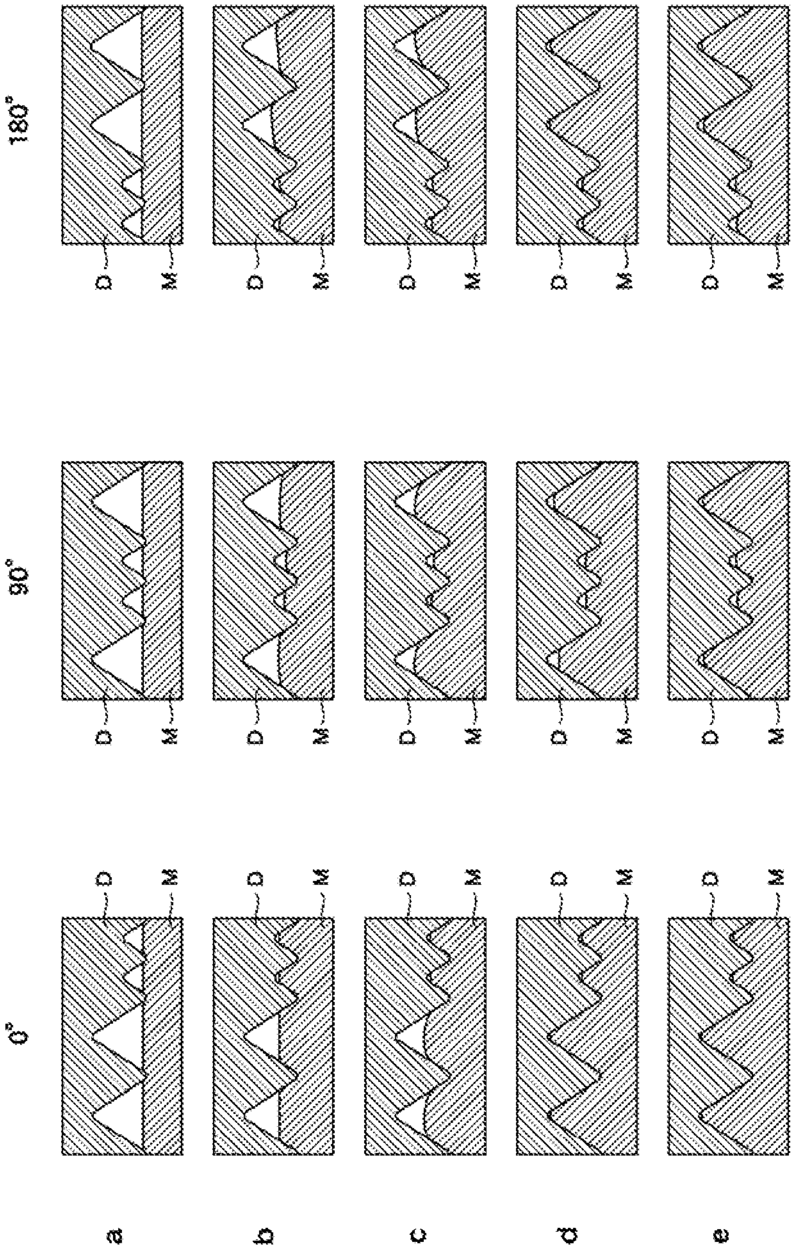
FIG. 7 is an explanatory view explaining the situation of charging for each angular position when rolling is implemented on the material for a screw with a rolling die, regarding the dual-threaded screw structure 11 according to the first embodiment.
Figure 8:
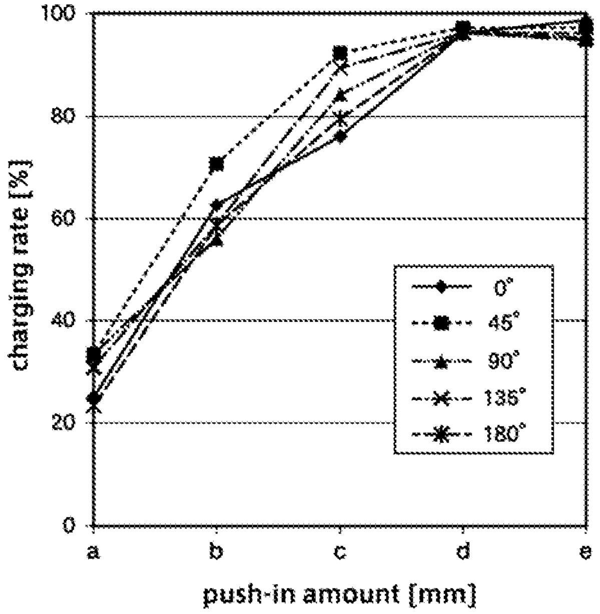
FIG. 8 is a graph showing the relation between the push-in amount of the rolling die and the charging rate into the vacant portion, regarding the dual-threaded screw structure 11 according to the embodiment 1.

Here, the area ratio (%) in FIG. 6 means the ratio (%) between the sectional area of the primary coarse thread with a triangular sectional shape and the sectional area of the aforementioned dual-threaded screw structures 10, 11 and 12 for each angular position. FIG. 7 is an explanatory view explaining the situation where rolled material is charged in the concave of the circular rolling die, for each angular position, when rolling is implemented on the dual-threaded screw structure 11 of the embodiment 1. FIG. 8 is a graph showing the relation between the push-in amount of the circular rolling die and the charging rate (%) when rolling with a circular rolling die on the dual-threaded screw structure 11 of the embodiment 1. This relation reveals that the dual-threaded screw structure 11 of the embodiment 1 can be rolled smoothly.

As explained above, the dual-threaded screw structures 10, 11 and 12 shown in FIGS. 2 to 4 are formed of a first thread (S1: a coarse thread) and a second thread (S2) of a "two-threaded thread having a three-times lead" (see FIGS. 2, 3) or a "one-threaded thread having a three-times lead" (see FIG. 4). FIGS. 2 to 4 show respective sectional configuration of the dual-threaded screw structures 10, 11 and 12 in an "angular position of 0°" and an "angular position of 90°" for explaining the composition thereof. Explanation will be made regarding other angular positions referring to FIGS. 5 and 6. FIGS. 5 and 6 are also views in comparison of a dual-threaded screw structure consisting of a coarse thread and a "known three-threaded thread" with the dual-threaded screw structures 10, 11 and 12 consisting of the above mentioned coarse thread of the embodiment 1 and a new multi-threaded thread (a one-threaded thread having a three-times lead), a "two-threaded thread having a three-times lead" and a varied example of a "two-threaded thread having a three-times lead".

That is, FIG. 5 a view showing the relation between angular positions for every 30° in the direction around the axis of the shank 3 on which the dual-threaded portion 2 shown in FIG. 1(*a*) is formed and the sectional figure of the dual-threaded portion 2. FIG. 6 is a graph showing the relation between angular positions for every 30 degrees in the direction around the axis of the shank 3 (see FIG. 1) and area ratios of the sectional area of the dual-threaded portion 2. In this dual-threaded screw structure, sectional shapes in a same combination appear repeatedly for each determined period, as shown in FIG. 5. For example, in the "two-threaded thread having a three-times lead" shown in FIG. 2, same shapes appear to be repeated for each period three times of the pitch of the coarse thread with a combination of two leads. FIG. 5 shows the sectional shapes of the dual-threaded portion 2. FIG. 6 shows the area ratio of the sectional area in the dual-threaded portion 2, in which area ratio compared in each angular position is shown, taking the sum of the sectional areas of triangular sectional areas of the thread ridge in the respective angular positions and the sum of the sectional areas of the coarse thread as a basic thread ridge as 100%.

As shown in FIG. 5, in the dual-threaded screw structure composed of a coarse thread and a "known three-threaded thread", the size of the thread ridge and pitch of the coarse thread and the "known three-threaded thread" are same, so that the thread ridges interfere with each other in determined angular position and there is an angular position in which few thread ridge remains (see the left end in FIG. 5). In this dual-threaded screw structure, the thread ridge is deformed in this angular position where few thread ridge remains and in the vicinity thereof, thus exhibiting a fear of insufficiency in strength of the shank or the tread portion. For example, this dual-threaded screw structure has a sectional figure of the dual-thread, in which low hill-like thread ridges with a height lower compared with the thread ridge of the basic thread ridge appear successively, in angular positions except an "angular position of 0°" and an "angular position of 180°", especially in an "angular position of 90°". Further, area ratio is low to be below 42% between the "angular position of 60°" and "angular position of 120°". That is, there are angular positions where strength of the dual-threaded portion is insufficient in the dual-threaded screw structure consisting of a coarse thread and a "known three-threaded thread".

As compared with this, in the dual-threaded screw structures 10, 11 and 12 of the embodiment 1, there is a portion where thread groove is not formed in the new multi-threaded thread as the second thread (S2) (angular positions of 0°, 180°, etc.), so that the volume of the thread ridge increases and there is no case where a basic thread ridge does not remain in either angular position. For example, the dual-threaded screw structure 10 (consisting of a coarse thread and a "two-threaded thread having a three-times lead") has a sectional figure of the dual-threaded portion 2 in which a thread ridge of a basic thread ridge appears in each determined interval even in an "angular position of 90°" and has a large area ratio as 56%. Further, the dual-threaded screw structure 12 (consisting of a coarse thread and a "one-threaded thread having a three-times lead") has a sectional shape of the dual-threaded portion 2 in which a thread ridge of a basic thread ridge appears in each thread ridge in an "angular position of 90°" and has a large area ratio as 78%. Furthermore, the dual-threaded screw structure 11 (a varied example of a coarse thread and a "two-threaded thread having a three-times of lead") has a sectional figure of the dual-threaded portion 2 in which a thread ridge of a basic thread ridge necessarily appears successively or in each determined interval although there is no angular position where thread ridges as basic thread ridges succeed and has a stable and large area ratio as 70 to 78%. That is, the dual-threaded screw structure 10, 11 and 12 are so formed as not to be insufficient in the strength of the tread portion.

The method for working by rolling of the dual-threaded screw structure will be explained, taking the dual-threaded screw structure 11 (varied example of a coarse thread and a "two-threaded thread having a three-times of lead") as an example. FIG. 7 is a view showing results of charging in angular positions of "0°", "90°" and "180°" when working by rolling of the dual-threaded screw structure 11 is implemented by pushing the rolling die D into the material of the screw. These angular positions, shown as typical examples, exhibit portions in which figures of the dual-threaded portion are largely different in the dual-threaded screw structure 10. Further, FIG. 8 is a graph showing the relation between the push-in amount in the working by rolling and the charging rate. As shown in FIGS. 7 and 8, process of working by rolling of the dual-threaded portion 2 is confirmed such that material M of screw is securely charged with plastic deformation into the vacancy formed between the rolling face of the screw rolling die D and the rolled face of the material M of screw in substantially same charging rate in each angular position screw.

Embodiment 2

Figure 9:
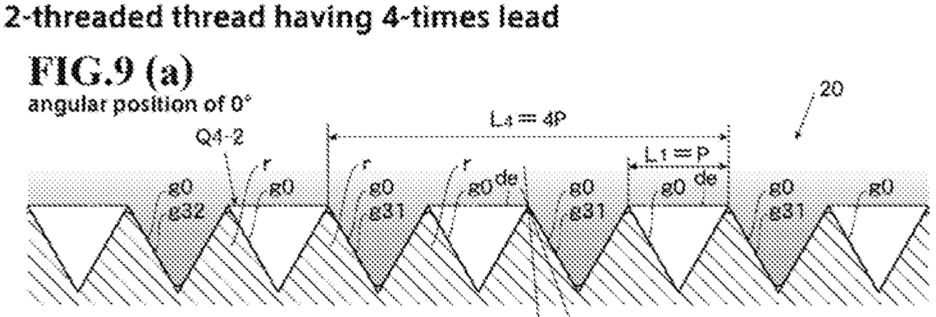
FIG. 9 is explanatory sectional views, taken in planes extending through the axis of the screw, of the dual-threaded portion of the dual-threaded screw structure 20 according to the embodiment 2 of the present invention for explaining composition of the dual-threaded screw, in which FIG. 9(*a*) shows partially a sectional configuration of the dual-threaded portion in "an angular position of 0°" and FIG. 9(*b*) shows partially a sectional configuration of the dual-threaded portion in "an angular position of 90°".
Figure 9:
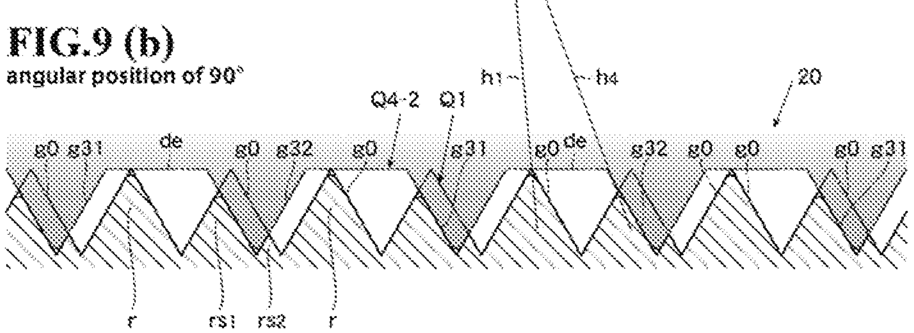

In the dual-threaded screw structure 20 according to the embodiment 2 shown in FIG. 9, a first thread (S1: a metric coarse thread) and a second thread (S2: two-threaded thread) formed on the thread ridge of the coarse thread and having a lead L4 (=4P) four-times of the pitch P of the coarse thread are formed. This two-threaded thread, formed in the dual-threaded portion of the dual-threaded screw structure 20, is a new multi-threaded thread (referred to as a "two-threaded thread having a four-times lead" below) in which a two-threaded thread is formed by extracting two threads (by two threads in the center of four threads) from common four-threaded thread.

Figure 10:
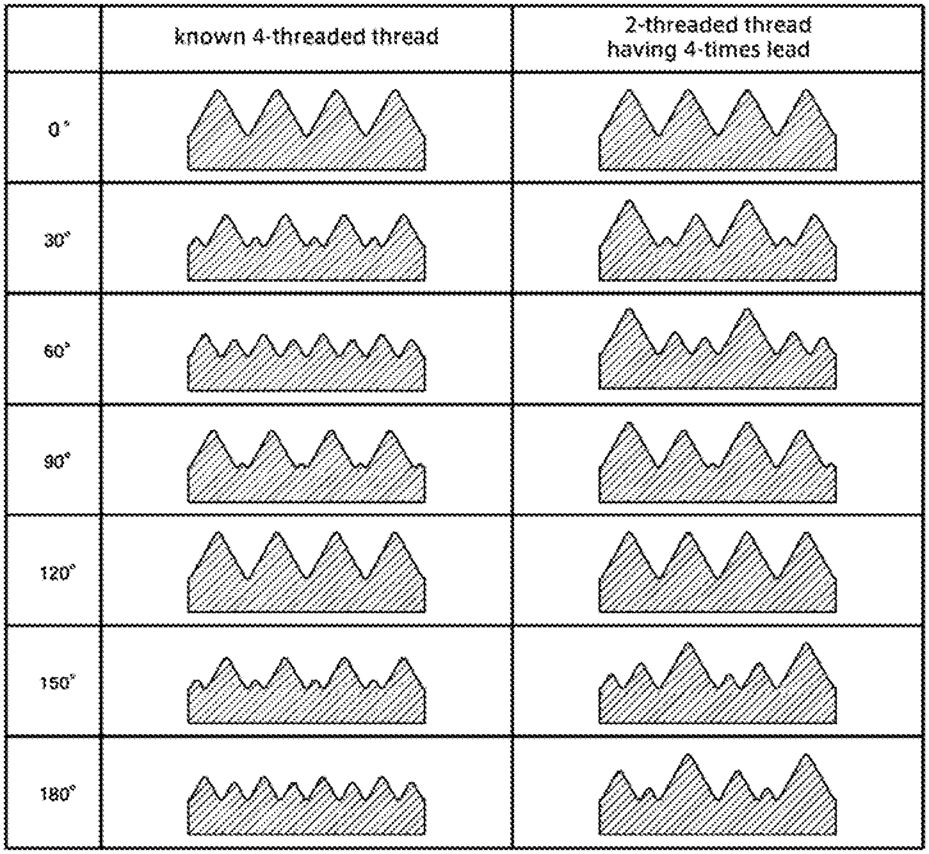
FIG. 10 is sectional views showing partially the sectional configuration of the dual-threaded portion in each angular position, regarding the dual-threaded screw structures 20 according to the embodiment 2 of the present invention and a dual-threaded screw structure consisting of a coarse thread and a known four-threaded thread.
Figure 11:
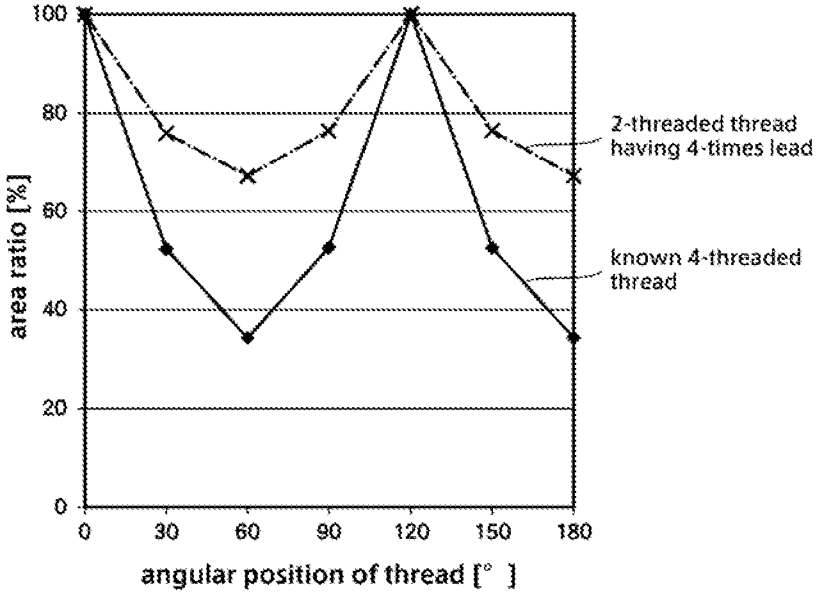
FIG. 11 is a graph showing the relation between each angular position and area ratio, regarding the dual-threaded screw structure 20 shown in FIG. 10.
Figure 12:
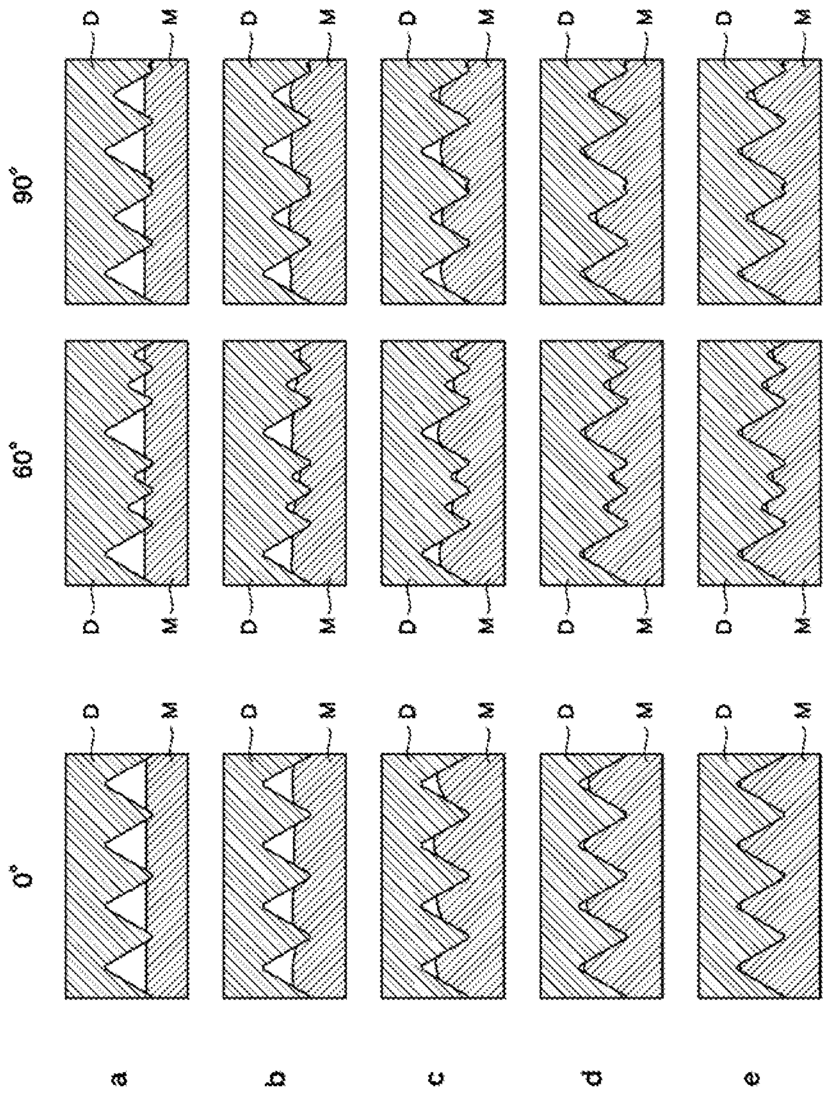
FIG. 12 is an explanatory view explaining the situation of charging for each angular position when rolling is implemented on the material for screw with a rolling die, regarding the dual-threaded screw structure 20 according to the embodiment 2.

FIGS. 9(*a*) and (*b*) is sectional views for explaining composition of the dual-threaded screw structure 20 of the embodiment 2, in which FIG. 9(*a*) shows partially a sectional figure of the dual-threaded portion 2 in an "angular position of 0°" and FIG. 9(*b*) shows partially a sectional figure of the dual-threaded portion in an "angular position of 90°". FIG. 10 is sectional views showing partially the sectional figure of the dual-threaded portion in each angular position, regarding the dual-threaded screw structures 20 of the embodiment 2 and a dual-threaded screw structure consisting of a coarse thread and a "known four-threaded thread" (a common four-threaded). FIG. 11 is a graph showing area ratio (%) of the dual-threaded portion 2 for each angular position, regarding the dual-threaded screw structure of the embodiment 2 and a dual-threaded screw structure consisting of a coarse thread and known four-threaded thread. FIG. 12 is an explanatory view for explaining the situation of charging in working by rolling of the dual-threaded screw structure of the embodiment 2 for each angular position.

FIG. 9 shows the sectional figures of the dual-threaded portion 2 in the dual-threaded screw structure 20 consisting of a coarse thread and a "two-threaded thread having a four-times lead" in an "angular position of 0°" and an "angular position of 90°". This dual-threaded screw structure 20 has a coarse thread having a pitch P (the lead $L_1$=P)

and a thread ridge of a two-threaded thread having a lead $L_4$ (=4P) four-times (integer number-times) of the pitch P of this coarse thread. Here, this two-threaded thread a "two-threaded thread having a four-times lead" in which two threads are extracted from a "known four-threaded thread". The coarse thread is a one-threaded thread having a lead $L_1$ same as the pitch P and a thread groove $g_0$ (or a thread ridge) along a spiral line $h_1$. The "two-threaded thread having a four-times lead" is a thread having a lead $L_4$ (=4P) and two-threaded grooves $g_{31}$, $g_{32}$ are formed along a spiral line $h_4$. In this, for convenience of explanation of the embodiment 2, explanation is made defining the angular position where the sectional shape of the groove $g_0$ of the coarse thread and the sectional shape of the grooves $g_{31}$, $g_{32}$ of the "two-threaded thread having a four-times lead" lap each other to be the "angular position of 0°".

In FIG. 9(*a*), (*b*), the sectional figure of the coarse thread is of a triangular thread having a pitch P shown with a contour line Q1. The "two-threaded tread having a four-times lead" is one in which two treads are extracted from a "known four-threaded thread". The "two-threaded thread having a four-times lead" is a thread shown with a contour line Q4-2 in which grooves $g_{31}$, $g_{32}$ are not formed (the greyed portion shows a nut screwed thereon). The "two-threaded thread having a four-times lead" is an irregular two-threaded thread having a lead $L_4$ (=4P) in which a portion de where a one-threaded thread is not formed between the grooves $g_{31}$ and $g_{32}$ and between the grooves $g_{32}$ and $g_{31}$ (a flat portion of outer peripheral face of the shank seen in section) is provided. In the "angular position of 0°", a standard dual-threaded configuration is formed in which a first thread ridge r as a basic thread ridge and a thread groove are formed successively. In the "angular position of 90°", a dual-threaded configuration is formed to have a contour line in which a first thread ridge r as a basic thread ridge and two low hill-like second thread ridges $r_{s1}$ and $r_{s2}$ lower than the first thread ridge r succeed.

While the "angular position of 0°" and "angular position of 90°" for the dual-threaded screw structure 20 are explained referring to FIG. (a) and (b), further explanation of the dual-threaded screw structure 20 will be made referring to FIGS. 10 and 11. FIGS. 10 and 11 are views comparing a dual-threaded screw structure consisting of a coarse thread and a "known four-threaded thread" (a common four-threaded thread) with the dual-threaded screw structure 20 of the embodiment 2 consisting of a coarse thread and a "two-threaded thread having a three-times lead". FIG. 10 shows the relation between the angular position for each 30° around the axis of the dual-threaded portion shown in FIG. 1(*a*) and the sectional shape of the dual-threaded portion. FIG. 11 is a graph showing the relation between the angular position for each 30° around the axis of the shank 3 and the area ratio of the sectional area of the dual-threaded portion 2. The area ratio of the sectional area of the dual-threaded portion is shown, taking the sum of the sectional areas of the coarse thread as a basic thread ridge in one period as 100% and comparing it with the sum of the sectional areas in respective angular positions in one period.

The size and pitch of the thread ridge of the coarse thread and "known four-threaded thread" are same in the dual-threaded screw structure consisting of a coarse thread and a "known four-threaded thread", so that the thread ridges interfere with each other in determined angular positions and there is an angular position in which few thread ridge remains. In this dual-threaded screw structure, the thread ridge is deformed in this angular position where few thread ridge remains and in the vicinity thereof, thus exhibiting a fear of insufficiency in strength of the tread portion. For example, this dual-threaded screw structure has a sectional figure of the dual-thread, in which low hill-like thread ridges succeed in the "angular position of 60°". Consequently, there is a tendency of insufficiency in strength of the threaded portion in a high extent in these angular positions. Further, regarding the area ratio of the sectional area in each angular position, the sectional area in the "angular position of 60°", "angular position of 180°" and "angular position of 300°" (not shown)" decreases in a high extent to be about 35%, taking the area ratio in the "angular position of 0°" as 100%. Thus, the strength of the dual-thread portion is insufficient.

Compared with this, the dual-threaded screw structure 20 (a coarse thread and a "two-threaded thread having a four-times lead" of the embodiment 2 has a portion in the "two-threaded thread having a two-times lead" in which a thread groove is not formed as shown in FIG. 10, so that the volume of the thread ridge increases and there is no case where no thread ridge remains. For example, this dual-threaded screw structure 20 has a sectional configuration of the dual-threaded portion 2 in which a thread ridge of a basic thread ridge necessarily appears successively or for each determined interval in any angular position. Further, with this dual-threaded screw structure 20, the area ratio in the in the "angular position of 60°", "angular position of 180°", etc., is about 68%, taking the area ratio in the "angular position of 0°" as 100%, as shown in FIG. 11. As a consequence, this dual-threaded screw structure 20, having a sectional configuration of the dual-threaded portion 2 in which a thread ridge of a basic thread ridge necessarily appears successively or for each determined interval, is formed so as not to be insufficient in strength of the thread portion.

Figure 13:
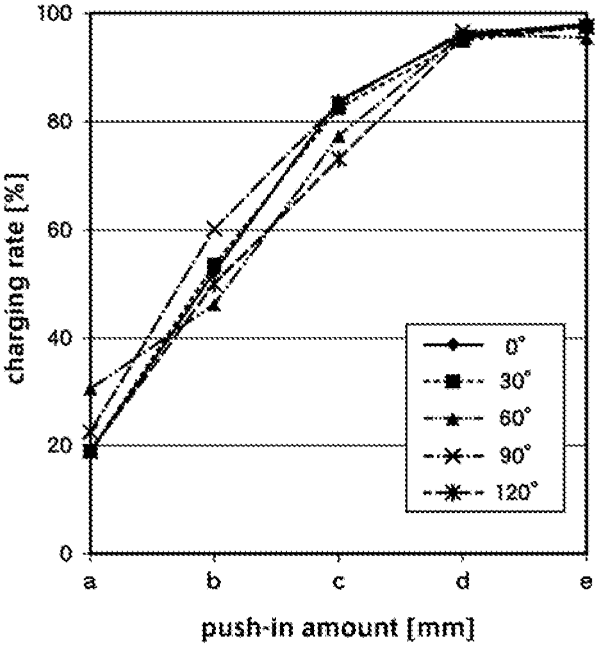
FIG. 13 is a graph showing the relation between the push-in amount of the rolling die and the charging rate into the vacant portion, regarding the dual-threaded screw structure 20 according to the embodiment 2.

FIG. 12 is a view showing results of charging in the "angular position of 0°", "angular position of 60°" and "angular position of 90°" when rolling is implemented with a rolling die D of screw pushed in the material M of screw. These angular positions, shown as typical examples, are ones in which the shape of the dual-threaded portion in the dual-threaded screw structure 20 varies to a large extent. Further, FIG. 13 is a graph showing the relation between the push-in amount in working by rolling and the charging rate. As shown in FIGS. 12 and 13, process of working by rolling of the dual-thread portion 2 is confirmed such that material M of screw is securely charged with plastic deformation into the vacancy formed between the rolling face of the screw rolling die D and the rolled face of the material M of screw in substantially same charging rate in each angular position screw.

Here, this dual-threaded screw structure may be one consisting of a coarse thread and a one-threaded thread having a four-times lead or three-threaded thread having a four-times lead that has a lead four-times of the pitch P of the coarse thread as well as a number of threads less by one thread or three threads.

Embodiment 3

Figure 14:
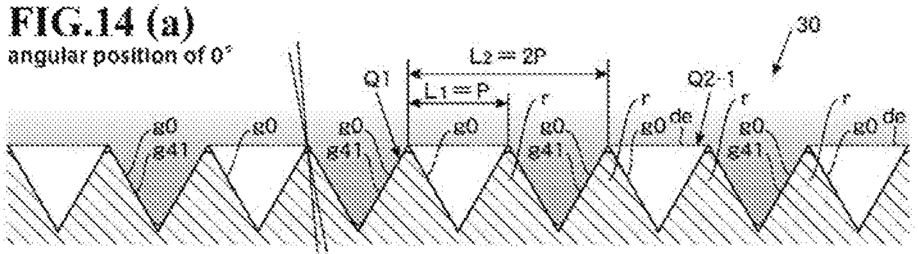
FIG. 14 is explanatory sectional views, taken in planes extending through the axis of the screw, of the dual-threaded portion of the dual-threaded screw structure 30 according to the embodiment 3 of the present invention for explaining composition of the dual-threaded screw, in which FIG. 14(*a*) shows partially a sectional configuration of the dual-threaded portion in "an angular position of 0°" and FIG. 14(*b*) shows partially a sectional configuration of the dual-threaded portion in "an angular position of 90°".
Figure 14:
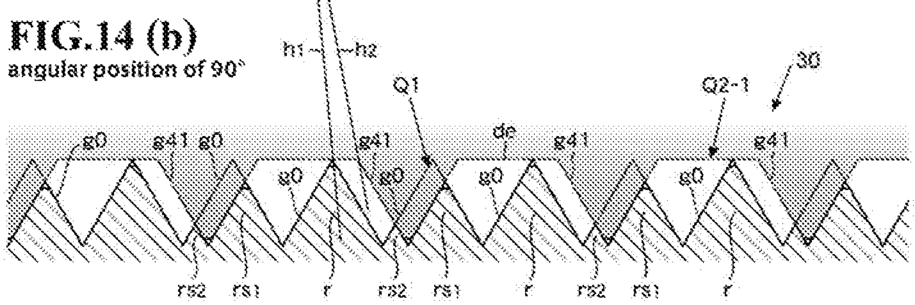

The dual-threaded screw structure 20 according to the embodiment 3 shown in FIG. 14 is a dual-threaded screw structure, in which a dual-threaded portion 2 is provided that consists of a first thread (S1: a metric coarse thread) and a second thread (S2: two-threaded thread) of a new multi-threaded thread of one-threaded thread having a lead $L_2$ two-times of the pitch P of the coarse thread (referred to a "one-threaded thread having a two-times lead" below). That is, this "one-threaded thread having a two-times lead" is a one-threaded thread, in which the first thread (S1) is a coarse thread and in the second thread (S2), having a lead two-times of the pitch P of the coarse thread, one thread is extracted from a primary two-threaded thread.

14(*a*) and (*b*) shows partially a sectional configuration of the dual threaded portion 2 of the dual-threaded screw structure 30 consisting of a coarse thread and a "one-threaded thread having a two-times lead" (a second thread (S2)) in an "angular position of 0°" and an "angular position of 90°". For example, the dual-threaded screw structure 30 is formed of a coarse thread having a pitch P (the lead $L_1$=P) and a "one-threaded thread having a two-times lead" consisting of a one-threaded thread having a lead two-times of the pitch P of the coarse thread in which one thread is extracted from a "known two-threaded thread" (a common two-threaded thread). The coarse thread is a one-threaded thread having a lead $L_1$ same as the pitch P, in which a thread groove $g_0$ (or a thread ridge) is formed along a spiral line $h_1$. The "one-threaded thread having a two-times lead" is a one-threaded thread having a lead $L_2$, in which a one-threaded groove $g_{41}$ is formed along a spiral line $h_2$. Here, for convenience of explanation, the embodiment 3 is explained defining the angular position where the sectional configuration of the groove $g_0$ of the coarse thread and the sectional configuration of the groove $g_{41}$ of the "one-threaded thread having a two-times lead" lap each other to be the "angular position of 0°".

In FIG. 14(*a*), (*b*), the coarse thread is a thread having a pitch P shown with a contour line Q1. The "one-threaded tread having a two-times lead" is a thread with one-threaded thread formed thereon having a lead $L_2$ (=2P) shown with a contour line Q2-1 in which one tread is extracted from a "known two-threaded thread" and in which a portion de where a one-threaded thread is not formed between the groove $g_{41}$ and $g_{41}$ (a flat portion of outer peripheral face of the shank seen in section) is provided. FIG. 14(*a*) shows the sectional configuration of the dual-threaded portion 2 of this dual-threaded screw structure 30 in the "angular position of 0°" and FIG. 14(*b*) shows the sectional configuration of the dual-threaded portion 2 of the dual-threaded screw structure 30 in the "angular position of 90°". In the "angular position of 0°", a first thread ridge r (or groove) formed as a basic thread ridge is formed successively. In the "angular position of 90°", a dual-threaded configuration is formed to have a contour line Q2-1 in which a first thread ridge r as a basic thread ridge, a second thread ridge $r_{s1}$ formed to be a middle level thread ridge a little lower than the first thread ridge r and a third thread ridge $r_{s2}$ formed to be a hill-like thread ridge lower than the second thread ridge $r_{s1}$ are formed.

Figure 15:
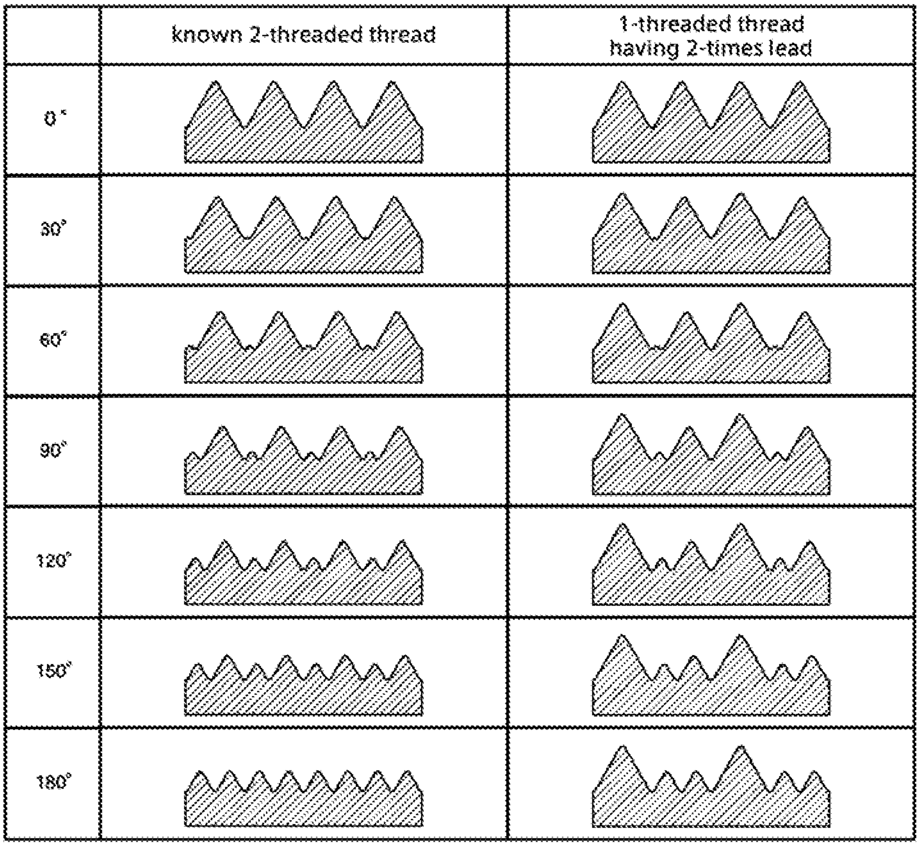
FIG. 15 is sectional views showing partially the sectional configuration of the dual-threaded portion in each angular position, regarding the dual-threaded screw structure 30 according to the embodiment 3 of the present invention and a dual-threaded screw structure consisting of a coarse thread and a known two-threaded thread.
Figure 16:
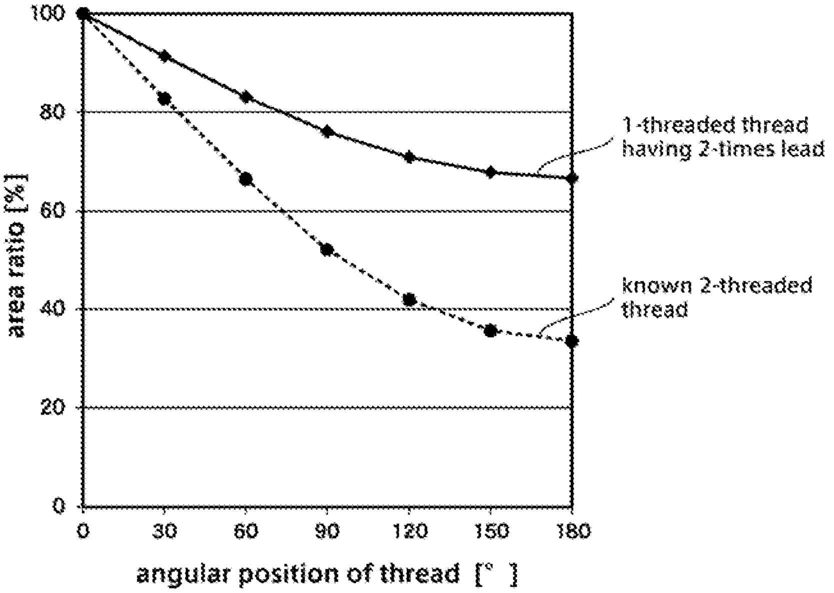
FIG. 16 is a graph showing the relation between each angular position and area ratio, regarding the dual-threaded screw structure 30 shown in FIG. 15.

While the "angular position of 0+" and "angular position of 90°" for the dual-threaded screw structure 30 of the embodiment 3 are explained, further explanation of the dual-threaded screw structure 30 will be made referring to FIGS. 15 and 16. FIGS. 15 and 16 are views comparing a dual-threaded screw structure consisting of a coarse thread and a "known two-threaded thread" with the dual-threaded screw structure 30 of the embodiment 3 consisting of a coarse thread and a "one-threaded thread having a two-times lead". FIG. 15 shows the relation between the angular position for each 30° around the axis of the shank 3 and the sectional configuration of the dual-threaded portion 2. FIG. 16 is a graph showing the relation between the angular position of the dual-threaded portion 2 for each 30° and the area ratio of the sectional area of the dual-threaded portion 2. The area ratio of the sectional area of the dual-threaded portion 2 is shown, taking the sum of the sectional areas of the coarse thread having a triangular sectional shape as a basic thread ridge in one period as 100% and comparing it with the sum of the sectional areas in respective angular positions in one period.

The size and pitch of the thread ridge of the coarse thread and "known two-threaded thread" are same in the dual-threaded screw structure consisting of a coarse thread and a "known two-threaded thread", so that the thread ridges interfere with each other in determined angular positions and there is an angular position in which few thread ridge remains. In this dual-threaded screw structure, the thread ridge is deformed in this angular position where few thread ridge remains and in the vicinity thereof, thus exhibiting a fear of insufficiency in strength of the tread portion. For example, this dual-threaded screw structure has a sectional configuration of the dual-thread, in which low hill-like thread ridges succeed in the "angular position of 180°" and the vicinity thereof (see the "angular position of 180°"). Consequently, there is a tendency of insufficiency in strength of the threaded portion in a high extent in this angular position. Further, regarding the area ratio of the sectional area in each angular position, the area ratio in the range from the "angular position of 120°" to the "angular position of 220° (not shown)" decreases in a high extent to be about 40%, taking the area ratio in the "angular position of 0 degree" as 100%.

Compared with this, the dual-threaded screw structure 30 of the embodiment 3 has a portion in the "one-threaded thread having a two-times lead" in which a thread groove is not formed, so that the volume of the thread ridge increases and there is no case where no thread ridge remains. This dual-threaded screw structure 30 has a sectional configuration of the dual-threaded portion 2 in which a thread ridge of a basic thread ridge necessarily appears successively or for each determined interval in any angular position. Due to this, the strength of the threaded portion is not insufficient. Further, with this dual-threaded screw structure 30, the area ratio is about 65% or more in any angular position, taking the area ration in the "angular position of 0°" as 100%.

[Tensile Strength of the Dual-Threaded Screw Structure]

Figure 17:
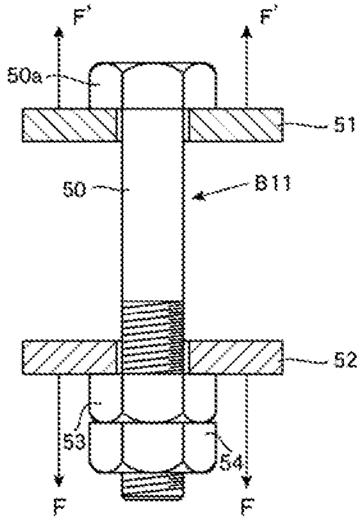
FIG. 17 is a schematic view of a testing device for measuring tensile strength of screws including the dual-threaded screw structure according to the present invention.
Figure 18:
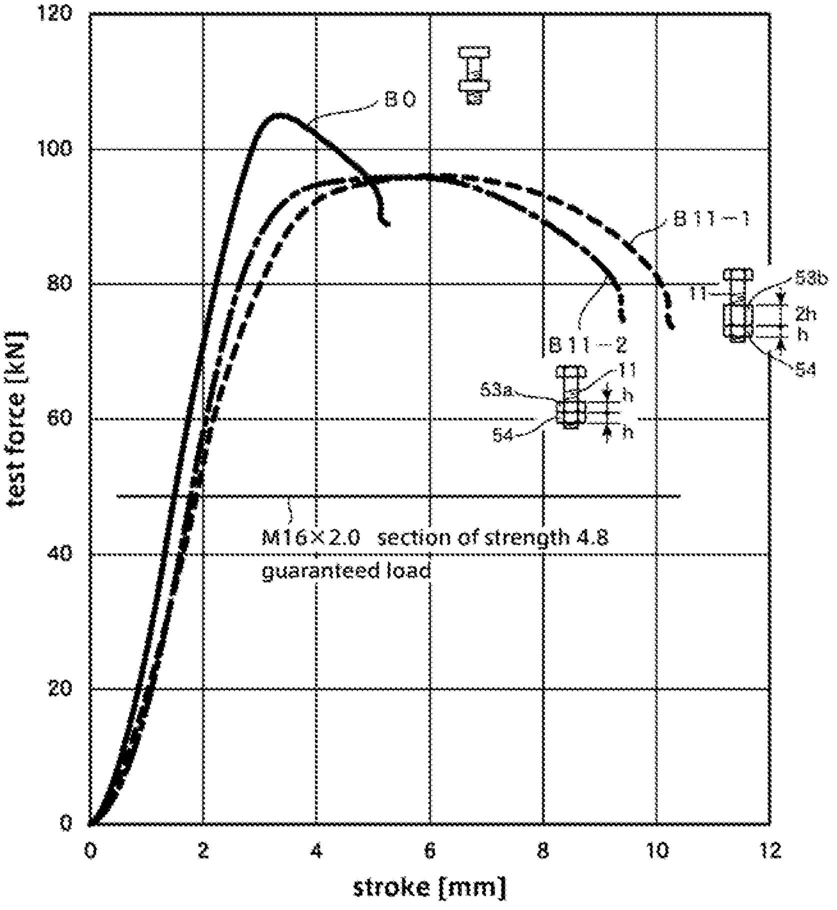
FIG. 18 is a graph showing a result of measurement test of tensile strength, regarding a common coarse thread screw and the dual-threaded screw structure 11 according to the varied example of the embodiment 1 (see FIG. 3).

Tensile strength has been confirmed regarding the dual-threaded screw structure of the embodiments 1 to 3 explained above. FIG. 17 is a schematic view of a testing device for measuring tensile strength of screws including the dual-threaded screw structure according to the present invention, with which tensile strength test has been implemented. The data shown in FIG. 18 shows a result of tensile strength test, regarding a common coarse thread screw and the dual-threaded screw structure 11 (see FIG. 3) according to the varied example of "two-threaded thread having a three-times lead". Here, this tensile strength is related mainly to the shear fracture stress in the axial direction of the dual-threaded screw structure.

A nut 53 for the second thread and a nut 54 for the first thread are screwed onto the bolt 50 having a head 50*a* in which a dual-threaded screw structure 11 is formed and the nut 53 for the first thread and the nut 54 for the second thread are fastened so as to provide a double-nut composition. For example, the nut 54 for the first thread is a nut with an internal thread of a coarse thread formed and the nut 53 for the second thread is a nut with an internal thread of a new multi-threaded thread. The bolt 50 is put through the bores for bolt formed in a fixed jig member 51 and a movable jig member 52 and the underside face of the head 50*a* of the bolt 50 is caused to sit on the fixed jig member 51. The movable jig member 52 is moved in the direction going apart from the fixed jig member 51 (in the direction of the arrow F) to apply a load on the bolt 50. In other words, tensile load F is applied between the head 50*a* of the bolt 50 and the nut 53 for the first thread, the nut 54 for the second thread and tensile strength of the bolt 50 was measured (see FIG. 17). This measurement was implemented until the shank of the bolt 50 is broken or the nuts drop out with collapse of the thread ridge.

Taking the dual-threaded screw structure 11 (a varied example of the embodiment 1) as a typical example, the result of tensile strength test will be explained further. FIG. 18 is a graph showing a result of tensile strength test of tensile strength, regarding a bolt B0 (e.g., a hexagon head bolt) having a common coarse thread of a "nominal designation" M16 formed and bolts B11 (e.g., a hexagon head bolt) having either of two kinds of the dual-threaded screw structure 11 formed respectively. Here, the dual-threaded screw structure 11, onto which a nut for 53*a* for the second thread and a nut 54 for the first thread is screwed as double nuts, is shown as a bolt structure B11-2 in FIG. 18 and the dual-threaded screw structure 11, onto which a nut for 53*b* for the first thread and a nut 54 for the second thread is screwed as double nuts, is shown as a bolt structure B11-1 in FIG. 18, in this explanation. Further, the nut 53*a* is a "common hexagon head nut of M16 (JIS B 1181)" having a standard height of h (e.g., 13 mm). The nut 53*b* is a nut formed to have a height 2h (e.g., 26 mm) two-times of the height of the nut 53*a* (e.g., 13 mm).

In FIG. 18, tensile strength (kN) is shown on the axis of ordinate and stroke of tensile test (mm) is shown on the axis of abscissa. As a result, it has been confirmed that the tensile strength of the bolt structure B11-1 and B11-2 formed with the dual-threaded screw structure 11 exhibits 90% or more of the tensile strength of a common bolt B0 of M16. That is, it has been confirmed that there is no problem practically in the dual-thread screw structure 11 formed to be the bolt structure B11-1 or B11-2. Further, it has been confirmed that the strength of this dual-threaded screw structure 11 is one that fully exceeds the guaranteed load (48,700 N) of a coarse thread of M16 in the section of strength 4.8. Here, while the dual-threaded screw structure 11 of a varied example of the first embodiment as a typical example has been explained for this embodiment, it has been confirmed that similar results can be obtained with the dual-threaded screw structure of other embodiments.

[Test of Nut Threading Torque]

Figure 19:
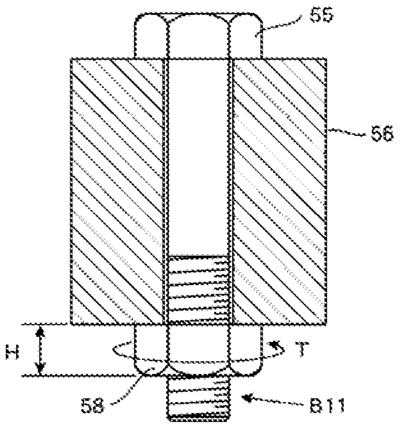
FIG. 19 is a schematic view of a testing device for implementing "test comparing threading torque" of screws including the dual-threaded screw structure according to the present invention.
Figure 20:
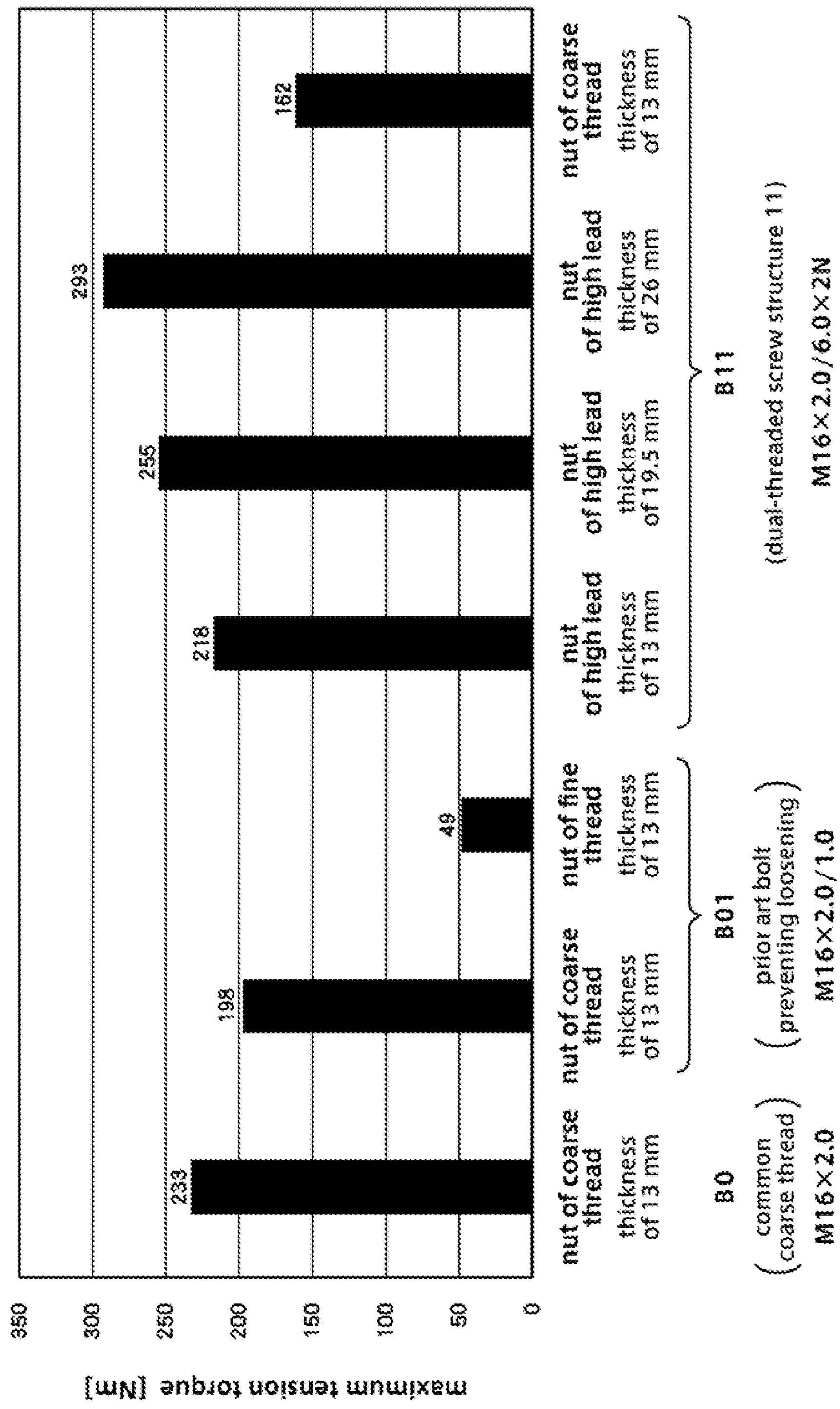
FIG. 20 is a bar graph showing a result of test of threading torque, regarding a prior art bolt preventing loosening that consists of a common thread and fine thread-coarse thread and the dual-threaded screw structure 11 according to the varied example of the embodiment 1 (see FIG. 3).

Test of nut threading torque was implemented regarding the above explained dual-threaded screw structures of embodiments 1 to 3 and the strength of these has been confirmed. FIG. 19 is a schematic view of a testing device for implementing "test comparing threading torque (maximum tension torque)" of screws including the dual-threaded screw structure according to the present invention. FIG. 20 is a bar graph showing a result of test of threading torque, regarding a prior art bolt preventing loosening that consists of a common thread and fine thread-coarse thread and the dual-threaded screw structure 11 of "two-threaded thread having a three-times lead" according to the varied example of the embodiment 1.

As shown in FIG. 19, with this testing device, a nut 58 is screwed onto the bolt 55 put through a block 56 and the nut 58 is fastened until tension torque increases no more, then the maximum tension torque at this time is measured with a torque wrench (not shown) (see FIG. 19). Further, in the test of nut threading torque, test is implemented for each of a bolt B0 having a common metric coarse thread formed, a prior art bolt preventing loosening B01 consisting of a coarse thread and a fine thread and a bolt B11 in which a dual-threaded screw structure 11 of a varied example of the embodiment 1 as explained above is formed and then values of respective maximum tension torque was compared each other.

As shown in FIG. 20, the second thread (S2) as a dual-threaded screw structure 11 is not inferior as compared with a bolt B0 with a common coarse thread regarding the value of maximum tension torque. That is, it has been confirmed that the bolt B11 as a dual-threaded screw structure 11, when it is fastened with a nut as an internal thread with a thread ridge of a new multi-threaded thread formed, can be fastened up to a substantially similar maximum tension torque as in the case where a common bolt B0 with a coarse thread is fastened with a common nut for a coarse thread. Further, with a higher (thicker) nut having a thread ridge of a new multi-threaded thread formed, the maximum tension torque becomes higher. Further, with this dual-treaded screw structure 11, it is confirmed that either of a "coarse thread nut" (162 Nm) for a coarse thread corresponding to a "fine thread nut" (49 Nm) for a fine thread and a "multi-thread nut" (218 to 293 Nm) of a new multi-threaded thread corresponding to a coarse thread nut increases as compared with a prior art bolt B01 preventing loosening consisting of a fine thread and a coarse thread. Here, while the dual-threaded screw structure as a typical example of the embodiment 1 has been explained regarding the embodiment, it has been confirmed that similar results of test were obtained with the dual-threaded screw structure of other embodiments.

[Performance of Preventing Loosening of Dual-Threaded Screw Structure]

Figure 21:
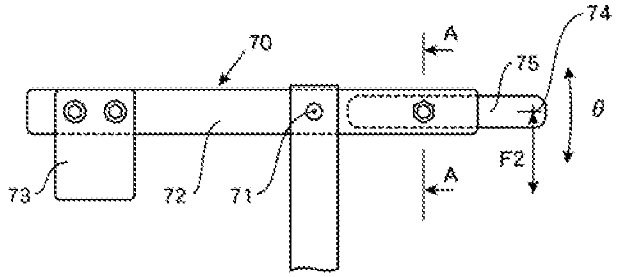
FIG. 21 is a schematic view of a testing device for confirming performance of a bolt preventing loosening, in which FIG. 21(*a*) is a front view schematically showing the main portion of the test device and FIG. 21(*b*) is an A-A sectional view taken in a line A-A.
Figure 21:
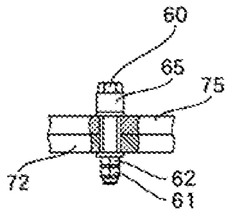
Figure 22:
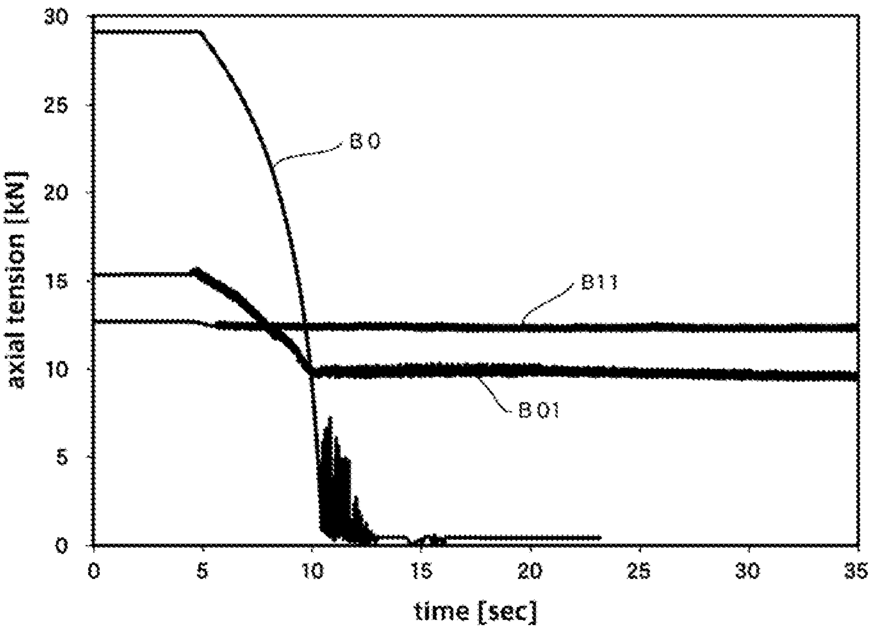
FIG. 22 is a graph showing a result of test comparing performance of preventing loosening, regarding a prior art bolt preventing loosening that consists of a common thread and fine thread-coarse thread and the dual-threaded screw structure 11 according to the varied example of the embodiment 1 (see FIG. 3).
Figure 23:
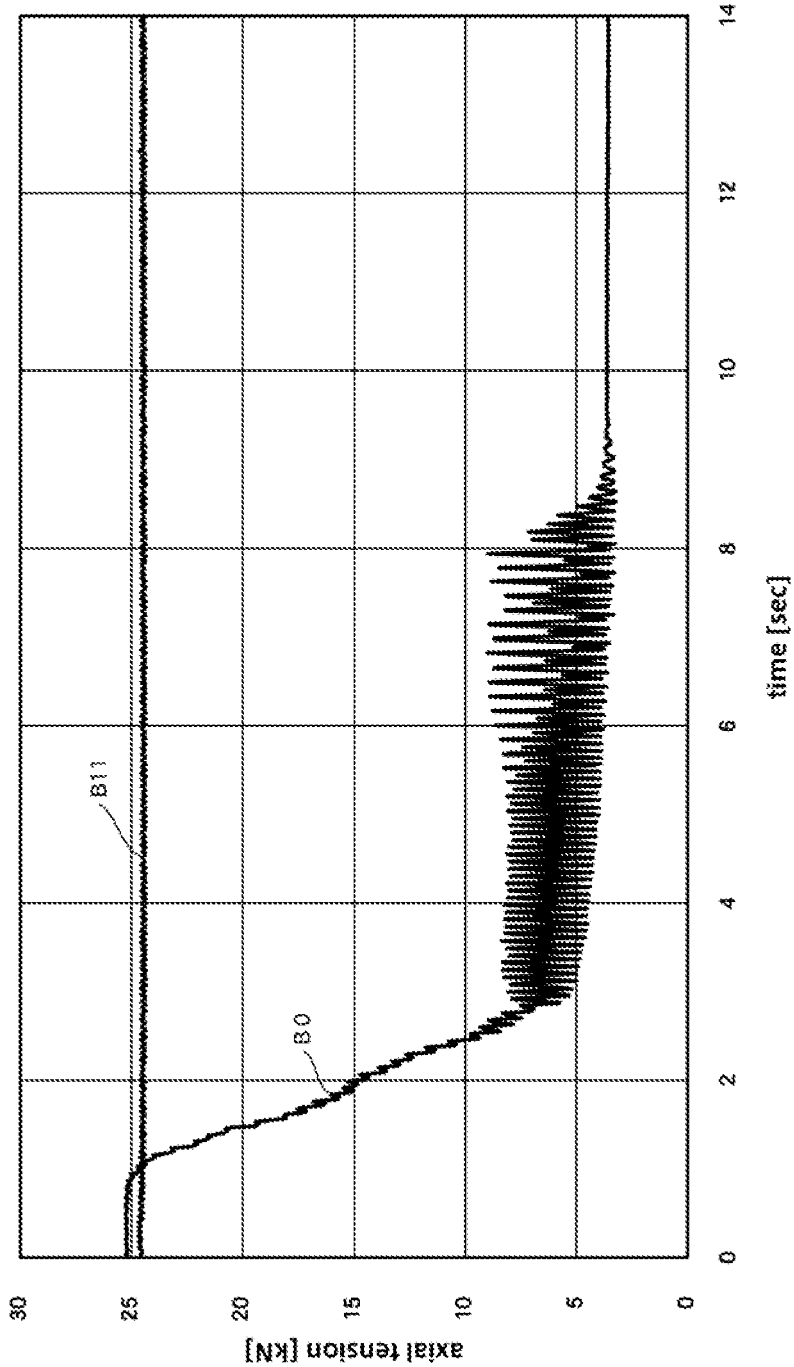
FIG. 23 is a graph showing a result of test comparing performance of preventing loosening, regarding a common coarse thread screw and the dual-threaded screw structure 11 according to the varied example of the embodiment 1 (see FIG. 3).

Performance of preventing loosening with dual-threaded screw structures 11 of the embodiments 1 to 3 explained above has been confirmed. FIG. 21 is a schematic view of a testing device for confirming performance of a bolt preventing loosening (manufactured by Nissei Co. Ltd.; Main Office in Yamanashi pref. Japan). FIG. 21(*a*) is a front view schematically showing the main portion of the test device and FIG. 21(*b*) is an A-A sectional view taken in a line A-A. FIG. 22 is a graph showing a result of test comparing performance of preventing loosening, regarding a prior art bolt (B01) preventing loosening that consists of a common thread and fine thread-coarse thread and the dual-threaded screw structure 11 (B11) as a varied example of the embodiment 1 ("a two-threaded thread having a three-times lead"). FIG. 23 is a graph showing a result of test comparing performance of preventing loosening, regarding a common coarse thread screw and the dual-threaded screw structure 11 as a varied example of the embodiment 1.

This testing device 70 of performance of preventing loosening is composed of a first member 72 that swings about a fulcrum 71, a weight 73 provided at a position apart from the fulcrum by a determined distance, a second member 75 having an excitation point 74, etc. The first member 72 and the second member 75 are combined with a bolt 60, a first nut 61 (a nut for fastening) and a second nut 62 (a nut for preventing loosening). The reference number 65 denotes a sensor for measuring axial force of the bolt 60 and the measured axial force is displayed on the main body of a measurement equipment (not shown). The first nut 61 and second nut 62 compose a so called double-nut. After the shank of the bolt 60 has been put through the bore for bolt in the first member 72 and the bore for bolt in the second member 75, the first nut 61 and the second nut 62 are fastened and fixed so as to provide a determined axial force. An excitation force F2 with a determined condition (frequency: 713 min-1, amplitude: 11 mm) is applied to the excitation point 74 to cause the second member 75 to swing in the direction of the arrow θ, and measurement with the sensor 65 is implemented regarding how the axial force of the bolt 60 changes at this time.

This test of performance of preventing loosening was implemented regarding a bolt B0 of M16 having a common coarse thread formed, a prior art bolt B01 preventing loosening consisting of a coarse thread and a fine thread and a bolt B11 having a dual-threaded screw structure formed. The bolt B0 having a coarse thread formed is fastened with a first nut and a second nut, as a double nut, having an internal coarse thread formed. The prior art nut B01 preventing loosening is fastened with a second nut having an internal fine thread and a first nut having an internal coarse thread, as a double nut. The bolt B11 having a dual-threaded screw structure formed is fastened with a nut 54 for a first thread (a nut for fastening) having an internal coarse thread formed and a nut 53 for a second thread (a nut preventing loosening) having an internal nut of a new multi-threaded nut, as a double nut.

As shown in FIG. 22, with the bolt 11 having a dual-threaded screw structure formed, substantially no decrease of axial force appeared when excitation has been applied and performance of preventing loosening was maintained. Compared with this, with the bolt B0 having a common coarse thread formed, axial force decreased in a high extent just after excitation has been applied and performance of preventing loosening was not maintained. Further, with the prior art bolt B01 preventing loosening, while a little decrease of axial force appeared just after excitation has been applied, performance of preventing loosening was maintained after then. In the next place, after the bolt B0 having a coarse thread formed and the bolt B11 having a dual-threaded screw structure formed before excitation is applied were fastened with a same axial force, test of applying excitation was implemented in the condition explained above to confirm performance of preventing loosening further.

As seen in FIG. 23 showing the result, with the bolt 11 having a dual-threaded screw structure 11, substantially no decrease of axial force appeared and performance of preventing loosening was maintained. On the other hand, with the bolt B0 having a coarse thread, axial force decreased just after excitation has been applied. That is, it has been confirmed that the dual-threaded screw structure 11 has performance of preventing loosening. Here, while the dual-threaded screw structure 11 of varied example of the embodiment 1 as a typical example has been explained regarding this test of performance of preventing loosening, it has been confirmed that similar result of test has been obtained with the dual-threaded screw structure of other embodiments.

This dual-threaded screw structure 1 has a thread ridge and groove corresponding to a coarse thread to have a configuration with rigidity and strength compared with a prior art dual-threaded screw having a coarse thread. The nut for a first thread fastened onto the first thread is in a fastening state of a common coarse thread in fastening, providing a composition that improves especially strength compared with a fine thread. Even if load has been applied to the a structure fastened with this dual-threaded screw structure 1 to apply axial force to the dual-threaded screw structure 1, the axial force is held with the nut for a first thread fastened onto the first thread. Further, with the dual-threaded screw structure 1, there is a difference between the leads of the first thread and second thread in addition to the friction force by fastening force between the nut for the first thread and the nut for the second thread, so that performance of preventing loosening can be obtained by causing the two nuts not to be rotated simultaneously. As a result, with this dual-threaded screw structure 1, axial force (torque) can be raised compared with a prior art composition preventing loosening of a dual-threaded screw structure having a fine thread.

Further, with a dual-threaded screw bolt consisting of a coarse thread and a fine thread as in a prior art, plating treatment with a thick layer cannot be applied to such a bolt having a fine thread, because such plating treatment causes the groove of the fine thread to be charged. For example, when plating treatment with a thick layer such as molten zinc plating having high corrosion resistance is applied to a bolt of a fine thread, plating is brought into the fine thread ridge to charge the thread groove. However, this dual-threaded screw structure 1 does not employ a fine thread, thus enabling such plating to be used. As a consequence, a bolt or shank having a dual-threaded screw structure 1 raises its value and performance by applying plating treatment and can be used in the field of construction or civil engineering requiring corrosion resistance in addition to the prior field of machine, electric industry.

Embodiment 4

Figure 26:
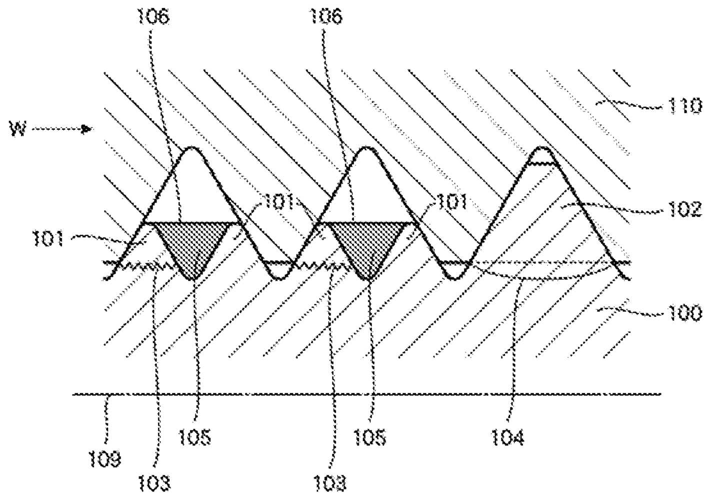
FIG. 26 is a sectional view taken in a specific angular position showing the dual-threaded screw structure (two-threaded screw having a four-times lead) with a fastening nut screwed thereon as an example in which base metal is charged into the vacancy (groove) between threads where two small thread ridges emerge.

As explained above referring to graphs showing the relation between the angular position (angle of screw) and the area regarding the dual-threaded screw structure explained referring to FIGS. 5 and 6, FIGS. 10 and 11 and FIGS. 15 and 16, the area ratio (%) is low in specific angular position. Due to this, when test of "tensile fracture strength" regarding each dual-threaded screw structure with the testing device shown in FIG. 17, shear fracture occurs in the portion with the low area ratio (%). There is no problem of strength in machine design, even if there is a portion with a low area ratio (%). However, when the applied stress exceeds the allowable shear fracture stress in design, shear fracture occurs at the portion with a low area ration (%) at first. FIG. 26 is a partial sectional view in a specific angular position of a dual-threaded screw structure with a fastening nut screwed thereon.

The kind of the first nut (a nut for fastening) 110 of this example is a nut of a metric coarse thread. FIG. 26 shows a section in an angular of the above explained dual-threaded screw structure 100 (the section in the angular of 90° of the "two-threaded thread having a three-times lead" shown in FIG. 5) and a section of a first nut 110. When the first nut 110 is screwed to fasten, an axial load W is applied to the dual-threaded screw structure 100 due to reaction from the fastened structure (not shown). In this angular position, when fastening is advanced until shear fracture occurs, shear fracture occurs at first in the position of line segment 103 (sectional shape) of the low hill-like thread ridge 101. The line segment 103 is parallel with the center line 109 of the dual-threaded screw structure 100 and shorter than the line segment 104 of the thread ridge 102 of a coarse thread with an ordinary size (sectional area). Due to this, when even load is applied to each thread ridge with axial load W from the first nut (a nut for fastening) 110, shear fracture occurs at first in the portion of the line segment 103 of the low hill-like thread ridge 101.

Even if the axial length of the first nut is enlarged, partial shear fracture occurs from the portion of the line segment 103 of the low hill-like thread ridge 101. Then, the dual-threaded screw structure 100 of the embodiment 4 is one in which the vacancy (groove) between the two neighboring low hill-like thread ridges 101 succeeding in the axial direction is formed to be a charged portion 105 with base metal (shown as greyed portions) in order to avoid shear fracture of the low hill-like thread ridge 101. As a result, one line segment of the low hill-like thread ridge 101 is integrated with that of the next hill-like thread ridge 101, enlarging the line segment length to be substantially same length of the line segment 104 of the thread ridge 102 of a common metric coarse thread. Consequently, even if an axial load W is applied to the low hill-like thread ridge 101 of the dual-threaded screw structure, this portion of the line segment 103 is not to be fractured beforehand.

Figure 27:
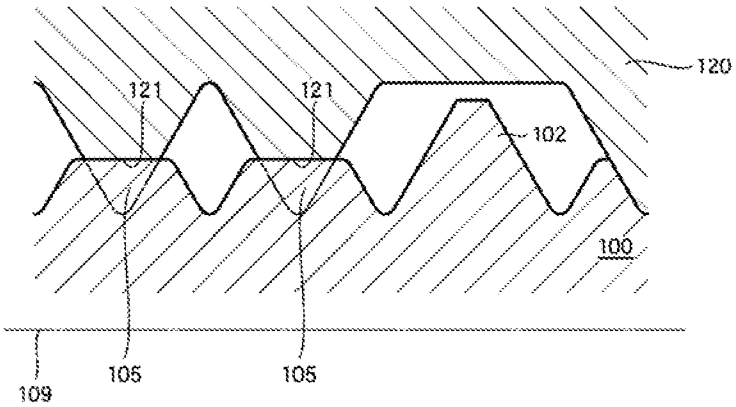
FIG. 27 is a sectional view taken in the specific angular position showing the dual-threaded screw structure shown in FIG. 26 with a fastening nut for preventing loosening screwed thereon.

FIG. 27 shows the sectional configuration of the dual-threaded structure (a two-threaded thread having a four-times lead) with a nut for preventing loosening screwed thereon. That is, the nut 120 for preventing loosening is a nut screwed onto the two-threaded thread having a four-times lead as the dual-threaded screw structure 10, being the other nut of the metric coarse nut. As shown in FIG. 26, the two low hill-like thread ridges 101 succeeding as a mountain range is charged in the charged portion 105. The second nut (a nut for preventing loosening) 120 has a linear portion (in section) 121, that is, a spiral bore provided, because this charged portion 105 is disposed so that the second nut is not capable of being engaged with the two low hill-like thread ridges 101 succeeding as a mountain range. In this angular position of the dual-threaded screw structure 10 of this embodiment (angular position of 60° in FIG. 10), the dual-threaded screw structure 10 and the second nut 120 (for preventing loosening) are not engaged substantially with the two low hill-like thread ridge succeeding as a mountain range.

Figure 28:
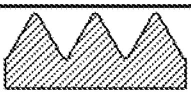
FIG. 28 is a sectional view, taken in each angular position with the fourth embodiment applied, of the dual-threaded screw structure of a "two-threaded screw having a three-times lead", "a varied example of two-threaded screw having a three-times lead" and a "one-threaded screw having three-times lead" according to the embodiment 1 in each angular position.
Figure 28:
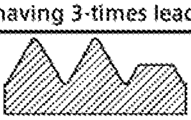
Figure 28:
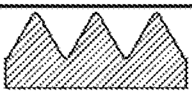
Figure 28:
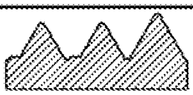
Figure 28:
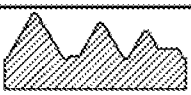
Figure 28:
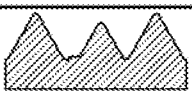
Figure 28:
Figure 28:
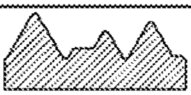
Figure 28:
Figure 28:
Figure 28:
Figure 28:
Figure 28:
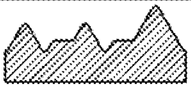
Figure 28:
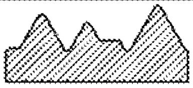
Figure 28:
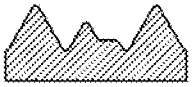
Figure 28:
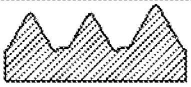
Figure 28:
Figure 28:
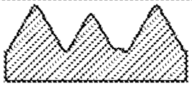
Figure 28:
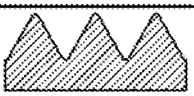
Figure 28:
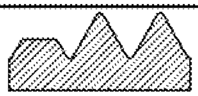
Figure 28:
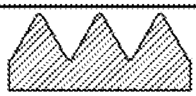
Figure 29:
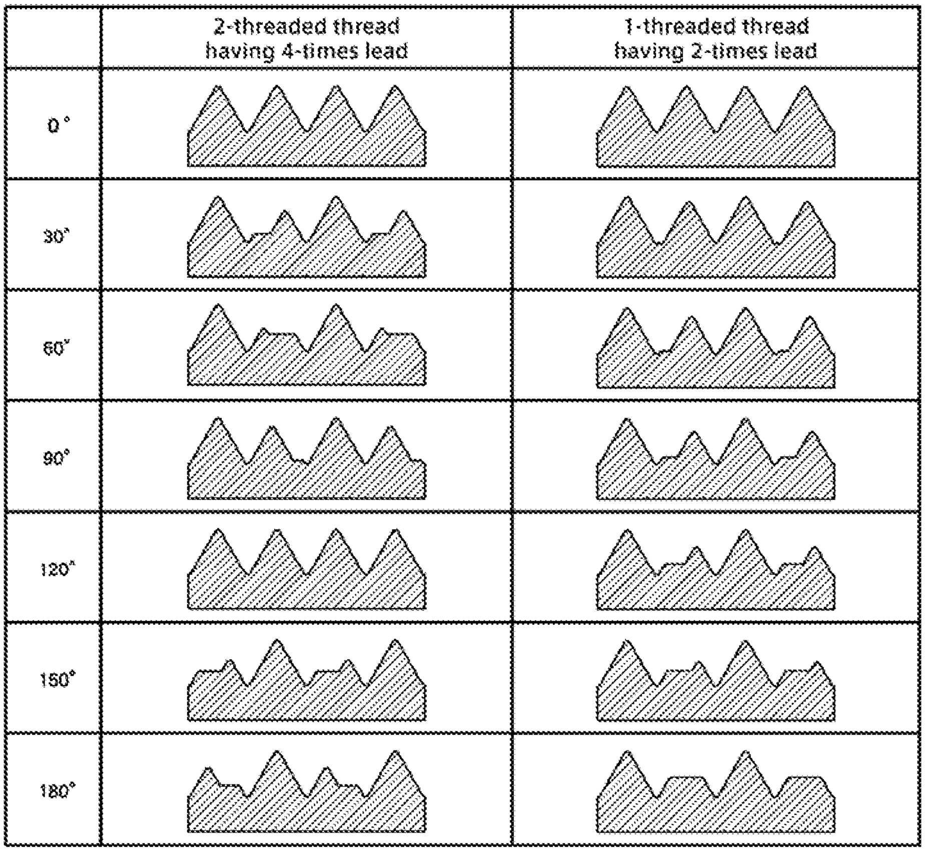
FIG. 29 is a sectional view, taken in each angular position, of the dual-threaded screw structures, regarding "two-threaded screw having four-times lead" according to the second embodiment shown in FIGS. 10 and 15 and the "one-threaded screw having two-times lead" according to the embodiment 2.

However, there is no problem, because fastening force is shared by the first nut 110 shown in FIG. 26. The function of the second nut 120 is not fastening force but function to prevent loosening of the first nut 110, so that shear fracture does not occur to the second nut 120. Here, if it is decided that the strength of shear fracture stress of the first nut 110 and the second nut 120 is insufficient in design, it may be preferred to enlarge the thickness of the nuts. FIG. 28 shows is sectional configuration, taken in each angular position, of the dual-threaded screw structures 10, 11 and 12 of a "two-threaded screw having a three-times lead", "a varied example of two-threaded screw having a three-times lead" and a "one-threaded screw having three-times lead" of the embodiment 1 shown in FIG. 5 with this embodiment 4 applied to, and also shows the sectional configuration where the vacancy (groove) between the two low hill-like thread ridges 101 succeeding as a mountain range is charged in the charged portion 105. Similarly, FIG. 29 shows sectional configuration, taken in each angular position, of the dual-threaded screw structures 20 of the "two-threaded thread having four-times lead" of the embodiment 2 shown in FIGS. 10 and 15 and the "one-threaded thread having two-times lead" of the embodiment 3.

Varied Example of Embodiment 4

Figure 30:
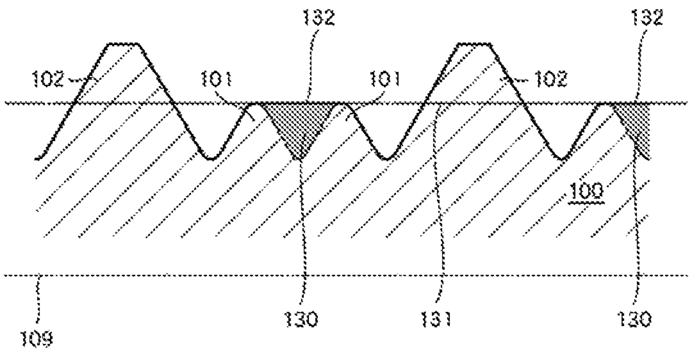
FIG. 30 is views showing varied examples of the charged portion in the embodiment 4, in which FIG. 30(*a*) shows an example in which base metal is charged into the vacancy (groove) between threads where two small thread ridges emerge up to the effective diameter, and FIG. 30(*b*) shows an example in which base metal is charged up to a diameter smaller than the effective diameter.
Figure 30:
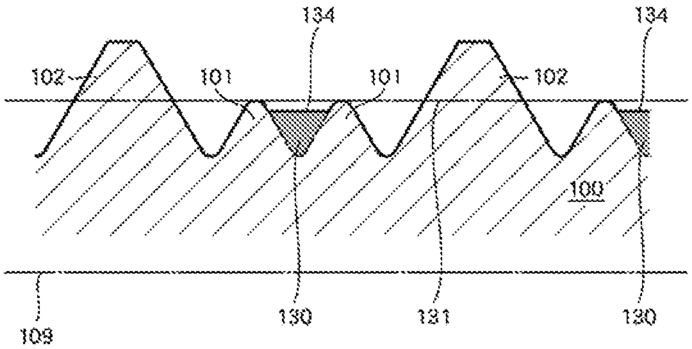

In the embodiment 4 explained above, the contour line 106 of the outer peripheral face of the charged portion 105 exhibits, in section, a line parallel with the center line 109 of the dual-threaded screw structure 100. However, charging method of the charged portion 105 is not limited to the method explained above. FIG. 30(*a*) shows the charged portion 130 charged up to the effective diameter 131 of the first thread (S1) composing the dual-threaded screw structure 100. That is, it is an example in which the intermediate vacancy between the two low hill-like thread ridges 101 is charged up to the outer peripheral face as the effective diameter 131 of the first thread (S1). The outer diameter (a part of a cylindrical face) 132 of the charged portion 130 is one same as the effective diameter 131. FIG. 30(*b*) shows an example of the charged portion, in the dual-threaded screw structure 100, that is charged up to an outer diameter (a part of a cylindrical face) 134 smaller than the effective diameter 131. Here, the above effective diameter means the diameter of an imaginary cylinder in which the width of the thread groove is equal to the width of the thread ridge.

Figure 31:
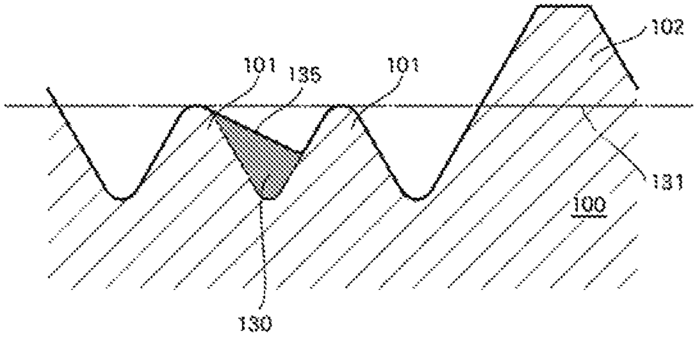
FIG. 31 is views showing varied examples of the charged portion in the fourth embodiment, in which FIG. 31(*a*) shows an example in which base metal is charged into the vacancy (groove) between threads where two small thread ridges emerge so that the contour in cross-sectional figure is slanted relative the center line, FIG. 31(*b*) shows an example in which base metal is charged to be of a V-shape and FIG. 31(*c*) shows an example in which base metal is charged to be of a convex shape.
Figure 31:
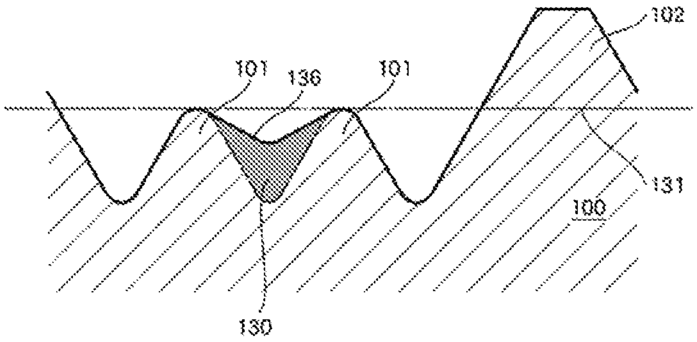
Figure 31:
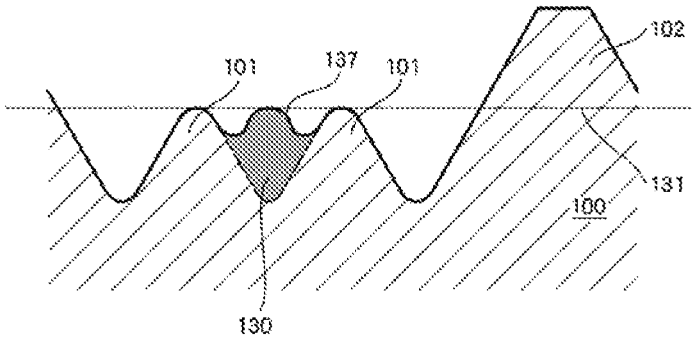

FIG. 31(*a*) shows an example of the charged portion 130, in the above dual-threaded screw structure 100, so that the outer diameter 135 of the charged portion 130 forms an inclined face. That is, the contour line of the outer diameter appearing in the sectional face of the charged portion 130 is an inclined line having an acute angle with the center line 109. FIG. 31(*b*) shows an example of the charged portion 130, in the above dual-threaded screw structure 100, so that the outer diameter 136 of the charged portion 130 forms a V-shaped inclined face. That is, the contour line of the outer diameter appearing in the sectional face of the charged portion 130 is a V-shaped line concave most in the center. FIG. 31(*c*) shows an example of the charged portion 130, in the above dual-threaded screw structure 100, so that the outer diameter 137 of the charged portion 130 forms a convexed face. The contour line of the outer diameter appearing in the sectional face of the charged portion 130 is a convex line convexed most in the center. Here, when the dual-threaded screw structure 100 is worked by rolling, the dual-threaded screw structure having a threaded portion with a contour line of the outer diameter of convex are or ellipse allows plastic deformation to be easy and is superior in workability by rolling. Consequently, the life time of rolling dies for rolling these dual-threaded screw structures is long.

Other Embodiments

While embodiments of the present invention has been explained, the present invention is not limited to these embodiments. It goes without saying that modification is possible without departing from the objects and gist of the present invention. For example, the dual-threaded screw structure may be one in combination of a two-threaded thread (a first thread (S1)) and a two-threaded thread having a four-times lead (a second thread (S2)), one in combination of a two-threaded thread having a three-times lead (a first thread (S1)) and a two-threaded thread having a four-times lead (a second thread (S2)) or others. In other words, the dual-threaded screw structure may be such that allows thread ridges of basic thread ridges or threads similar to basic thread ridges to be formed successively or in each determined interval in each angular position around the axis of the shank.

Further, while the above embodiments have been explained taking the lead of the first thread (S1) and the second thread (S2) as being one an integer number-times of the lead of the coarse thread, it may not be specifically of an integer number-times of the coarse thread. For example, the second thread may have a lead such as 3.1 times of the coarse thread or the first thread may have a lead such as 1.1 times of the coarse thread. That is, the dual-threaded screw structure may be such that allows thread ridges of basic thread ridges or threads similar to basic thread ridges to be formed successively or in each determined interval in each angular position around the axis of the shank.

Further, while the above embodiments have been explained taking the dual-threaded screw structures as formed by working by rolling with a circular rolling die or a plate die, it may be formed by a kind of working selected from machining, working by injection molding, working by a 3D printer (3-dimensional manufacturing), working by metal injection molding, lost-wax casting, etc. Here, forming of thread ridge by rolling has a feature such that a screw having a structure with high tensile strength and fatigue strength can be formed, because metal flow line within metal structure is not cut off by rolling and macro fiber structure flows continuously along the thread face.

Applied Example 1

FIG. 24 shows an example of the aforementioned dual-threaded screw structure applied to a fastening tool with a nut preventing loosening, in which FIG. 24(*a*) is a partial sectional view and FIG. 24(*b*) is a sectional view showing engagement of the nut with the dual-threaded screw structure. This is an example of the fastening tool 80 with a nut preventing loosening that clamps members 86 to be fastened. A "coarse thread" and a "two-threaded thread having a three-times lead" shown in FIG. 2 are formed on a thread portion 81 as a shank of a hexagon headed bolt 81. A first nut 82 is screwed onto the "coarse thread". The thread ridge (a spiral line $h_1$) of this first nut 82 is a standardized common thread ridge. In this example, a conical face 83 is formed on one end of the first nut 82 to be integral therewith. Further, a second nut 84 is screwed onto the "two-threaded thread having a three-times lead" (a spiral line $h_3$). The second nut 84, threaded onto the "two-threaded thread having a three-times lead", has a lead longer than that of the first nut 82 (identical with the pitch P), so that its advancement per a rotation is larger.

A conical concave 85 is formed on one end of the second nut 84. When the first nut 82 is screwed, its conical face 83 comes in contact with the conical concave 85 of the second nut 84, so that strong clamping is provided with frictional force of taper connection. Further, it is not necessary to screw the second nut 84 as a nut preventing loosening, because the second nut 84 can be driven in rotation simultaneously only by screwing the first nut 82 in rotation. This is brought by the situation that, because the lead of the second nut 84 is longer than the pitch P of the first nut, the second nut 84 is rotated to be clamped only by screwing the first nut 82.

Applied Example 2

Figure 25:
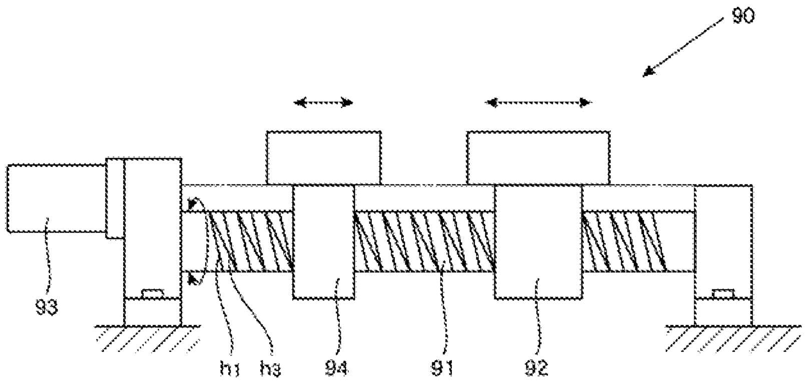
FIG. 25 is a conceptional view showing an example of the dual-threaded screw structure used as a lead cam mechanism.

FIG. 25 is a front view showing an example of the dual-threaded screw structure applied to a lead cam mechanism 90. While the aforementioned embodiments have been explained with metric coarse thread, this is an example of a dual-threaded screw structure having a two kinds of thread ridges and grooves with various pitches and leads as mentioned above formed that is used for a lead cam 91. A first cam follower 92 is screwed onto the "coarse thread" (a spiral line h1) and a second cam follower 94 is screwed onto the "two-threaded thread having a three-times lead" (a spiral line h3). The second cam follower 94 is engaged with a multi-threaded thread groove. When the lead cam 91 is driven to rotation with a servomotor 93, the rotation movement is transformed into a desired translational movement utilizing the situation in which the first cam follower 92 and the second cam follower 94 is different in advance per a rotation. The desired advance is attained with the frequency of the servomotor 93, the pitch of the "coarse thread" and the lead of the "two-threaded thread having a three-times lead". Consequently, the dual-threaded screw structure referred to in the present invention means a lead cam.

While the above embodiments have been explained taking thread ridges as metric coarse threads, the thread ridge may be a Whitworth thread, a unified thread, a fine thread, etc., that is standardized and has a similar triangular sectional shape of the thread ridge. Consequently, the "thread with a standard pitch (P)" formed on the periphery of the cylindrical shank in the dual-threaded screw structure is not limited to a metric coarse thread, but it is defined as a thread in which a thread groove having a substantially or approximately same shape as of a thread ridge as a basic thread is formed along with the thread ridge.

APPLICABILITY IN INDUSTRY

The dual-threaded screw structure according to the present invention can be applied to machine industry, electric industry, construction, civil engineering, space engineering, automobile, railway, ship, etc., requiring a structure fastened with screws having function of preventing loosening or a lead cam that enables two feedings with various leads or pitches to be performed simultaneously.

EXPLANATION OF REFERENCE

1, 10, 11, 12, 20, 30 dual-threaded screw structure
2 dual-threaded portion
3 shank
80 fastening tool with a nut for preventing loosening
90 lead cam mechanism
105 charged portion
54, 61, 82, 110 first nut
53, 62, 84, 120 second nut
$g_0$ thread groove of first thread (coarse thread)
$g_1$, $g_2$, $g_{11}$, $g_{12}$, $g_{21}$ thread of second thread (two-threaded thread having a three-times lead)
$g_{31}$, $g_{32}$ thread groove of second thread (two-threaded thread having a four-times lead)
$g_{41}$ thread groove of second thread (two-threaded thread having a two-times lead)
Q1 contour line of first thread
Q3-1, Q3-1', Q3-2, Q4-2, Q2-1 contour line of second thread
B11, B12 bolt
D rolling die for rolling dual-threaded screw structure
M material of screw

What is claimed is:

1. A dual-threaded screw structure having two kinds of threads formed on the shank, said dual-threaded screw structure comprising:

a first thread formed on the shank with a pitch to have a triangular sectional shape of the thread ridge, and a second thread formed on said thread ridge of the first thread successively in the same twisting direction as said thread ridge of the first thread to have a triangular sectional shape of the thread ridge, the second thread consisting of a thread or threads in which the number of threads is less by at least one thread than that of a primary multi-threaded thread having a lead equal to a determined number (n)-times of the pitch of the thread and the second thread yet having a lead same as that of said primary multi-threaded thread.

2. The dual-threaded screw structure according to claim 1, wherein said determined number (n) is an integer number-times of the pitch, the lead of said second thread is two-times of the pitch of said thread ridge, and the number of threads of said multi-threaded thread is two threads and one-thread of said thread is formed.

3. The dual-threaded screw structure according to claim 2, wherein the lead of said second thread is three-times of the pitch of said thread ridge, and the number of threads of said multi-threaded thread is three threads and one-thread or two-threads of said thread is formed.

4. The dual-threaded screw structure according to claim 2, wherein the lead of said second thread is four-times of the pitch of said thread ridge, and the number of threads of said multi-threaded thread is four threads and two-threads of said thread is formed.

5. The dual-threaded screw structure according to claim 2, wherein, in said first thread and second thread, the groove between the low thread ridges appearing in particular angular positions in the section including the axis line of said dual-threaded screw structure is charged with a base metal.

6. The dual-threaded screw structure according to claim 2, wherein said first thread and second thread are rolled threads in which macro fiber structure of base material flows continuously along the thread ridges.

7. The dual-threaded screw structure according to claim 2, wherein said first thread is a metric coarse thread.

8. The dual-threaded screw structure according to claim 2, wherein said dual-threaded screw structure has a shank of a bolt, a first nut screwed onto said first thread and a second nut having a triangular sectional shape of the thread ridge and screwed onto said second thread, said dual-threaded screw structure being a part of a fastening tool for fastening a member with another member to be fixed.

9. The dual-threaded screw structure according to claim 2, wherein said dual-threaded screw structure is a part of a lead cam device having said shank as a lead cam, a first cam follower engaged with said first thread and a second cam follower engaged with said second thread.

10. The dual-threaded screw structure according to claim 1, wherein the lead of said second thread is three-times of the pitch of said thread ridge, and the number of threads of said multi-threaded thread is three threads and one-thread or two-threads of said thread is formed.

11. The dual-threaded screw structure according to claim 1, wherein the lead of said second thread is four-times of the pitch of said thread ridge, and the number of threads of said multi-threaded thread is four threads and two-threads of said thread is formed.

12. The dual-threaded screw structure according to claim 1, wherein, in said first thread and second thread, the groove between the low thread ridges appearing in particular angular positions in the section including the axis line of said dual-threaded screw structure is charged with a base metal.

13. The dual-threaded screw structure according to claim 12, wherein the outer diameter of said groove is an effective diameter of said first thread.

14. The dual-threaded screw structure according to claim 1, wherein said first thread and second thread are rolled threads in which macro fiber structure of base material flows continuously along the thread ridges.

15. The dual-threaded screw structure according to claim 1, wherein said first thread is a metric coarse thread.

16. The dual-threaded screw structure according to claim 1, wherein said dual-threaded screw structure has a shank of a bolt, a first nut screwed onto said first thread and a second nut having a triangular sectional shape of the thread ridge and screwed onto said second thread, said dual-threaded screw structure being a part of a fastening tool for fastening a member with another member to be fixed.

17. The dual-threaded screw structure according to claim 1, wherein said dual-threaded screw structure is a part of a lead cam device having said shank as a lead cam, a first cam follower engaged with said first thread and a second cam follower engaged with said second thread.

* * * * *